United States Patent
Shenoy

(10) Patent No.: US 11,968,118 B2
(45) Date of Patent: *Apr. 23, 2024

(54) PLANNING AND MANAGING NETWORK PROBES USING CENTRALIZED CONTROLLER

(71) Applicant: Juniper Networks, Inc., Sunnyvale, CA (US)

(72) Inventor: Nagaraja Manikkar Shenoy, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/186,552

(22) Filed: Mar. 20, 2023

(65) Prior Publication Data
US 2023/0231801 A1    Jul. 20, 2023

Related U.S. Application Data

(63) Continuation of application No. 17/173,766, filed on Feb. 11, 2021, now Pat. No. 11,611,504, which is a (Continued)

(51) Int. Cl.
*H04L 45/302* (2022.01)
*H04L 41/12* (2022.01)
(Continued)

(52) U.S. Cl.
CPC ............ *H04L 45/302* (2013.01); *H04L 41/12* (2013.01); *H04L 43/08* (2013.01); *H04L 43/12* (2013.01); *H04L 45/02* (2013.01); *H04L 45/64* (2013.01)

(58) Field of Classification Search
CPC ......... H04L 45/64; H04L 43/20; H04L 45/02; H04L 45/302; H04L 43/08; H04L 41/12; (Continued)

(56) References Cited

U.S. PATENT DOCUMENTS 7,996,556 B2    8/2011  Raghavan et al.
8,693,374 B1    4/2014  Murphy et al.
(Continued)

FOREIGN PATENT DOCUMENTS

CN    101371497 A    2/2009
CN    105164975 A    12/2015
(Continued)

OTHER PUBLICATIONS

Extended Search Report from counterpart European Application No. 19181903.6, dated Dec. 12, 2019, 7 pp.
(Continued)

*Primary Examiner* — Maharishi V Khirodhar
*Assistant Examiner* — Kenneth P Hunt
(74) *Attorney, Agent, or Firm* — Shumaker & Sieffert, P.A.

(57) ABSTRACT

In general, the disclosure describes techniques for measuring edge-based quality of experience (QoE) metrics. For instance, a network device may construct a topological representation of a network, including indications of nodes and links connecting the nodes within the network. For each of the links, the network device may select a node device of the two node devices connected by the respective link to measure one or more QoE metrics for the respective link, with the non-selected node device not measuring the QoE metrics. In response to selecting the selected node device, the network device may receive a set of one or more QoE metrics for the respective link for data flows flowing from the selected node device to the non-selected node device. The network device may store the QoE metrics and determine counter QoE metrics for data flows flowing from the non-selected node device to the selected node device.

20 Claims, 8 Drawing Sheets

Related U.S. Application Data continuation of application No. 16/354,402, filed on Mar. 15, 2019, now Pat. No. 10,924,392.

(51) Int. Cl.
*H04L 43/08* (2022.01)
*H04L 43/12* (2022.01)
*H04L 45/02* (2022.01)
*H04L 45/64* (2022.01)

(58) Field of Classification Search
CPC ..... H04L 45/0377; H04L 41/40; H04L 45/30; H04L 41/122
See application file for complete search history.

(56) References Cited

U.S. PATENT DOCUMENTS

| | | | |
|---|---|---|---|
| 10,135,701 B2 | 11/2018 | Wu et al. | |
| 10,200,248 B1 | 2/2019 | Jiang et al. | |
| 10,924,392 B2 | 2/2021 | Shenoy | |
| 11,611,504 B2 * | 3/2023 | Shenoy | H04L 43/12 |
| 2005/0081116 A1 | 4/2005 | Bejerano et al. | |
| 2007/0177518 A1 | 8/2007 | Li et al. | |
| 2012/0233308 A1 | 9/2012 | Van De Houten et al. | |
| 2014/0307556 A1 | 10/2014 | Zhang | |
| 2016/0094398 A1 | 3/2016 | Choudhury et al. | |
| 2016/0149784 A1 | 5/2016 | Zhang et al. | |
| 2016/0218927 A1 | 7/2016 | Johnsson et al. | |
| 2016/0380892 A1 | 12/2016 | Mahadevan et al. | |
| 2021/0168068 A1 | 6/2021 | Shenoy | |

FOREIGN PATENT DOCUMENTS

| | | |
|---|---|---|
| CN | 107005439 A | 8/2017 |
| WO | 2013184846 A1 | 12/2013 |

OTHER PUBLICATIONS

Prosecution History from U.S. Appl. No. 16/354,402, dated Aug. 6, 2020 through Jan. 12, 2021, 46 pp.

Prosecution History from U.S. Appl. No. 17/173,766, dated Sep. 23, 2022 through Nov. 14, 2022, 47 pp.

Response to Extended Search Report dated Dec. 12, 2019 from counterpart European Application No. 19181903.6, filed Mar. 11, 2021, 18 pp.

* cited by examiner

PLANNING AND MANAGING NETWORK PROBES USING CENTRALIZED CONTROLLER

This application is a continuation of U.S. application Ser. No. 17/173,766 filed Feb. 11, 2021, which is a continuation of U.S. patent application Ser. No. 16/354,402, filed Mar. 15, 2019, the entire content of each of which being incorporated by reference herein.

TECHNICAL FIELD

The disclosure relates to computer networks.

BACKGROUND

Over the last few decades, the Internet has grown exponentially from a small network comprising of few nodes to a worldwide pervasive network that services more than a billion users. Today, individual subscribers are not limited to running a few network sessions with voice and/or data downloads over the network. Instead, the extent of services used by subscribers varies widely from multimedia gaming, audio and video streaming, web services, voice over IP (VoIP), and the like. With new technology penetration, such as increased utilization of Internet of Things (IoT) and M2M (machine to machine) communications, the network services and the software applications that a given subscriber may require also varies from a few sessions to multiple sessions having concurrent flows. This number is growing rapidly as subscribers increasingly run multiple applications, services, transactions simultaneously. The increased amount and variety of subscriber sessions and packet flows create challenges for network service providers with respect to network performance, such as latency, delay, and jitter.

SUMMARY

In general, the disclosure describes techniques for a centralized controller using network topology information to developing a probing plan in accordance with high-level intent configuration to determine application quality of experience metrics (QoE) for links in the network. For example, a controller such as a Software-Defined Networking (SDN) controller that implements the techniques described herein may evaluate a topology of a network such as a Software-Defined Wide Area Networks (SD-WAN), determining which nodes are connected and how many other nodes each node is directly connected to. The SDN controller may evaluate traffic flows to construct the topology of the network for evaluation. This topology may also indicate which nodes are performing probing processes on the various links. Using this topology, the SDN controller may modify the probing plan implemented in the topology, such as by pruning from the topology to cease some of the probing processes that the SDN controller determines to be redundant, reducing the overall traffic in the network.

In some SD-WANs, the SDN controller may specify a path for data flows between client devices and application servers. These paths are typically selected using service-level agreement (SLA) parameters and various QoE metrics of the WAN links. While the SLA parameters may be more static in nature, or at least predetermined prior to an SD-WAN appliance receiving the flow, the metrics of the various WAN links may be more dynamic, as the metrics describing the capabilities of the particular WAN link may vary based on various current aspects of the network. These metrics are obtained by sending probe packets on the various links and analyzing the results of the transmission, where probe packets having the same size as the data packets in the data flow reasonably measure how the particular WAN link could handle the data flow.

The probe packets that are sent over the links within a network may take up valuable bandwidth and other resources, as a node (e.g., an SD-WAN appliance) is inserting data into the flows that are in addition to the normal application traffic that must be transmitted over the links. When each node device is transmitting multiple probe packets over every link connected to the respective node, the amount of extraneous data transmitted over the links can be great. This issue is only compounded when node devices send probe packets over complex paths consisting of multiple links in an effort to determine QoE metrics for the complex path.

Rather than instructing each node device to measure the QoE metrics for each link connected to the node device and/or for each other node device in the SD-WAN, including over complex paths, the techniques described herein may select a single node of the two nodes connected by a particular link to measure the QoE metrics for the particular link. The SDN controller may then cycle through the links and select one of the two nodes connected by the respective link to measure the QoE metrics for that particular link. From this measured set of QoE metrics, the SDN controller may extrapolate the data to estimate QoE metrics for the reverse direction on the same link and for complex paths consisting of multiple links, including the link for which the QoE metrics were measured. For instance, the SDN controller may use the measured QoE metrics as the QoE metrics for the reverse direction of the link (e.g., the direction flowing from the non-selected node device to the selected node device).

There may be one or more advantages to using the techniques described herein. While the actual metrics may not be identical in all situations, a particular link will generally have similar QoE metrics in each direction. Similarly, when sending probe packets over a complex path consisting of multiple links, while the QoE metrics may not exactly be a combination of the links that make up the complex path, taking a combination of the QoE metrics across each link may still provide accurate estimates of the QoE metrics for the path. As such, estimating the QoE metrics for various links between node devices in the manner described by the techniques of this disclosure may greatly reduce the bandwidth and other resources consumed by the node devices in an effort to reliably determine QoE metrics for the entire network. As node devices have fewer probe packets to generate and process, this may also increase the efficiency of each individual node device, including reducing central processing unit (CPU) usage, memory using, and power consumption for each individual node device, thereby improving the functioning of the node devices.

Further, the SDN controller may capture the user intent (e.g., to measure user diagram protocol (UDP) performance across the network via synthetic probes). The SDN controller may also analyze the network topology and build a map of the current topology, all while utilizing existing probes. The SDN controller may reduce redundancy by using a single measurement to extrapolate QoE metrics for reverse paths and additional logical paths (e.g., VPNs, etc.) originating from the same device. The SDN controller may prune the probes to avoid duplicates and redundancy (e.g., device on the reverse path need not probe again). The SDN controller may alternatively or additionally redistribute the probes to ensure the uniform distribution across the topology (or the sub-set within the topology). In other words, given the potential non-uniformity of network topologies, the SDN controller may execute an algorithm that redistributes the probing responsibilities across the various node devices such that no single node device is tasked with probing a vastly unequal amount of links.

The SDN controller may leverage the existing interface on the device to configure and monitor the probes. This architecture may further maintain this intent map to correlate the probe related metrics (e.g., jitter, packet loss, etc.). Through utilizing this SDN controller, a network administrator may better visualize the state of network to help aid in better planning.

In one example of the techniques described herein, a method is described, the method including, constructing, by a network device for a network that includes a plurality of node devices, a topological representation of the network, wherein the topological representation comprises an indication of each of the plurality of node devices and an indication of each link of a plurality of links, each link connecting two node devices of the plurality of node devices. The method also includes, for each of the plurality of links, selecting, by the network device and based on the topological representation of the network, a node device of the two node devices connected by the respective link to measure one or more quality of experience (QoE) metrics for the respective link, wherein the non-selected node device does not measure the QoE metrics for the respective link, in response to selecting the selected node device to measure the one or more QoE metrics for the respective link, receiving, by the network device and from the selected node device, a set of one or more QoE metrics for the respective link, wherein the set of one or more QoE metrics indicate QoE metrics for data flows flowing from the selected node device to the non-selected node device, storing, by the network device, the set of QoE metrics for the respective link in a database, and determining, by the network device and based on the set of one or more QoE metrics for the respective link, a set of one or more counter QoE metrics indicating QoE metrics for data flows flowing from the non-selected node device to the selected node device.

In another example of the techniques described herein, a network device is described. The network device includes a memory. The network device also includes one or more processors in communication with the memory. The one or more processors are configured to, construct, for a network that includes a plurality of node devices, a topological representation of the network, wherein the topological representation comprises an indication of each of the plurality of node devices and an indication of each link of a plurality of links, each link connecting two node devices of the plurality of node devices. The one or more processors are also configured to, for each of the plurality of links, select, based on the topological representation of the network, a node device of the two node devices connected by the respective link to measure one or more quality of experience (QoE) metrics for the respective link, wherein the non-selected node device does not measure the QoE metrics for the respective link, in response to selecting the selected node device to measure the one or more QoE metrics for the respective link, receive, from the selected node device, a set of one or more QoE metrics for the respective link, wherein the set of one or more QoE metrics indicate QoE metrics for data flows flowing from the selected node device to the non-selected node device, store the set of QoE metrics for the respective link in a database, and determine, based on the set of one or more QoE metrics for the respective link, a set of one or more counter QoE metrics indicating QoE metrics for data flows flowing from the non-selected node device to the selected node device.

In another example of the techniques described herein, a non-transitory computer-readable storage medium is described, the non-transitory computer-readable storage medium storing instructions thereon that when executed cause one or more processors, via execution of a software-defined networking (SDN) device, to, construct, for a network that includes a plurality of node devices, a topological representation of the network, wherein the topological representation comprises an indication of each of the plurality of node devices and an indication of each link of a plurality of links, each link connecting two node devices of the plurality of node devices. The instructions, when executed, also cause the one or more processors to, for each of the plurality of links, select, based on the topological representation of the network, a node device of the two node devices connected by the respective link to measure one or more quality of experience (QoE) metrics for the respective link, wherein the non-selected node device does not measure the QoE metrics for the respective link, in response to selecting the selected node device to measure the one or more QoE metrics for the respective link, receive, from the selected node device, a set of one or more QoE metrics for the respective link, wherein the set of one or more QoE metrics indicate QoE metrics for data flows flowing from the selected node device to the non-selected node device, store the set of QoE metrics for the respective link in a database, and determine, based on the set of one or more QoE metrics for the respective link, a set of one or more counter QoE metrics indicating QoE metrics for data flows flowing from the non-selected node device to the selected node device.

In another example of the techniques described herein, a method is described, the method including, receiving, by a network device, configuration data indicative of a user intent for measuring application quality of experience (QoE) in a network that includes a plurality of node devices and a plurality of links, each link connecting two node devices of the plurality of node devices. The method further includes constructing, by the network device, a topological representation of the network, wherein the topological representation comprises an indication of each of the plurality of node devices and an indication of each link of the plurality of links. The method also included modifying, by the network device and based on the user intent and the topological representation of the network, one or more entries from an initial probing list to create a modified probing list, wherein the initial probing list comprises a plurality of entries, wherein each entry indicates a particular node device from the plurality of node that is performing a probing process for a particular link of the plurality of links. The method further includes instructing, by the network device and in accordance with the modified probing list, one or more node devices of the plurality of node devices to perform the probing process on the respective link in the corresponding entry in the modified probing list, wherein the probing process generates the application QoE metric data for the respective link. The method also includes, in response to receiving the application QoE metric data from the one or more node devices instructed to perform the probing process, aggregating, by the network device, the application QoE metric data.

In another example of the techniques described herein, a network device is described. The network device includes a memory. The network device also includes one or more processors in communication with the memory. The one or more processors are configured to receive configuration data indicative of a user intent for measuring application quality of experience (QoE) in a network that includes a plurality of node devices and a plurality of links, each link connecting two node devices of the plurality of node devices. The one or more processors are further configured to construct a topological representation of the network, wherein the topological representation comprises an indication of each of the plurality of node devices and an indication of each link of the plurality of links. The one or more processors are also configured to modify, based on the user intent and the topological representation of the network, one or more entries from an initial probing list to create a modified probing list, wherein the initial probing list comprises a plurality of entries, wherein each entry indicates a particular node device from the plurality of node that is performing a probing process for a particular link of the plurality of links. The one or more processors are further configured to instruct, in accordance with the modified probing list, one or more node devices of the plurality of node devices to perform the probing process on the respective link in the corresponding entry in the modified probing list, wherein the probing process generates the application QoE metric data for the respective link. The one or more processors are also configured to, in response to receiving the application QoE metric data from the one or more node devices instructed to perform the probing process, aggregate the application QoE metric data.

In another example of the techniques described herein, a non-transitory computer-readable storage medium is described, the non-transitory computer-readable storage medium storing instructions thereon that when executed cause one or more processors, via execution of a software-defined networking (SDN) device, to receive configuration data indicative of a user intent for measuring application quality of experience (QoE) in a network that includes a plurality of node devices and a plurality of links, each link connecting two node devices of the plurality of node devices. The instructions further cause the one or more processors to construct a topological representation of the network, wherein the topological representation comprises an indication of each of the plurality of node devices and an indication of each link of the plurality of links. The instructions also cause the one or more processors to modify, based on the user intent and the topological representation of the network, one or more entries from an initial probing list to create a modified probing list, wherein the initial probing list comprises a plurality of entries, wherein each entry indicates a particular node device from the plurality of node that is performing a probing process for a particular link of the plurality of links. The instructions further cause the one or more processors to instruct, in accordance with the modified probing list, one or more node devices of the plurality of node devices to perform the probing process on the respective link in the corresponding entry in the modified probing list, wherein the probing process generates the application QoE metric data for the respective link. The instructions also cause the one or more processors to, in response to receiving the application QoE metric data from the one or more node devices instructed to perform the probing process, aggregate the application QoE metric data.

The details of one or more examples are set forth in the accompanying drawings and the description below. Other features, objects, and advantages will be apparent from the description and drawings, and from the claims.

DETAILED DESCRIPTION

Figure 1:
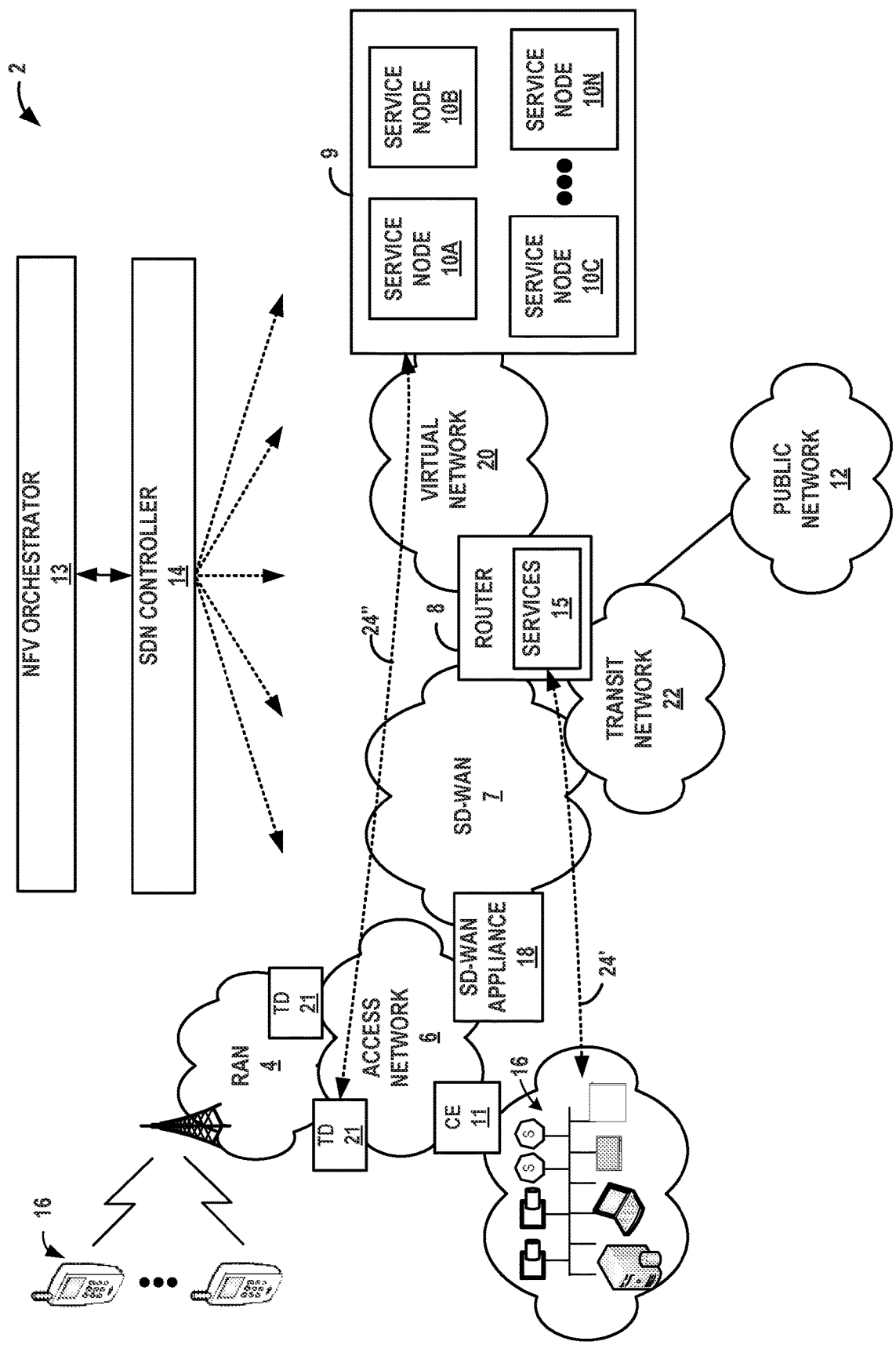
FIG. 1 is a block diagram illustrating an example software-defined wide area network system that performs edge-based routing techniques, in accordance with the techniques of this disclosure.

FIG. 1 is a block diagram illustrating an example software-defined wide area network system 2 that performs edge-based routing techniques, in accordance with the examples described herein.

The example network system of FIG. 1 includes a SD-WAN system 2 that operates as a private network to provide packet-based network services to subscriber devices 16. That is, SD-WAN system 2 provides authentication and establishment of network access for subscriber devices 16 such that a subscriber device may begin exchanging data packets with public network 12, which may be an internal or external packet-based network such as the Internet.

In the example of FIG. 1, SD-WAN system 2 comprises access network 6 that provides connectivity to public network 12 via service provider software-defined wide area network 7 (hereinafter, "SD-WAN 7") and router 8. SD-WAN 7 and public network 12 provide packet-based services that are available for request and use by subscriber devices 16. As examples, SD-WAN 7 and/or public network 12 may provide bulk data delivery, voice over Internet protocol (VoIP), Internet Protocol television (IPTV), Short Messaging Service (SMS), Wireless Application Protocol (WAP) service, or customer-specific application services. Public network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various examples, public network 12 is connected to a public WAN, the Internet, or to other networks. Public network 12 executes one or more packet data protocols (PDPs), such as IP (IPv4 and/or IPv6), X.25 or Point-to-Point Protocol (PPP), to enable packet-based transport of public network 12 services.

In general, subscriber devices 16 connect to gateway router 8 via access network 6 to receive connectivity to subscriber services for applications hosted by public network 12 or router 9. A subscriber may represent, for instance, an enterprise, a residential subscriber, or a mobile subscriber. Subscriber devices 16 may be, for example, personal computers, laptop computers or other types of computing devices positioned behind customer equipment (CE) 11, which may provide local routing and switching functions. Each of subscriber devices 16 may run a variety of software applications, such as word processing and other office support software, web browsing software, software to support voice calls, video games, video conferencing, and email, among others. For example, subscriber device 16 may be a variety of network-enabled devices, referred generally to as "Internet-of-Things" (IoT) devices, such as cameras, sensors (S), televisions, appliances, etc. In addition, subscriber devices 16 may comprise mobile devices that access the data services of SD-WAN system 2 via a radio access network (RAN) 6. Example mobile subscriber devices include mobile telephones, laptop or desktop computers having, e.g., a 3G wireless card, wireless-capable netbooks, video game devices, pagers, smart phones, personal data assistants (PDAs) or the like.

A network service provider operates, or in some cases leases, elements of access network 6 to provide packet transport between subscriber devices 16 and router 8. Access network 6 represents a network that aggregates data traffic from one or more of subscriber devices 16 for transport to/from SD-WAN 7 of the service provider. Access network 6 includes network nodes that execute communication protocols to transport control and user data to facilitate communication between subscriber devices 16 and router 8. Access network 6 may include a broadband access network, a wireless LAN, a public switched telephone network (PSTN), a customer premises equipment (CPE) network, or other type of access network, and may include or otherwise provide connectivity for cellular access networks, such as a radio access network (RAN) (not shown). Examples include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the WiMAX forum.

SD-WAN appliance 18 may be a customer edge (CE) router, a provider edge (PE) router, or other network device between access network 6 and SD-WAN 7. SD-WAN 7 offers packet-based connectivity to subscriber devices 16 attached to access network 6 for accessing public network 12 (e.g., the Internet). SD-WAN 7 may represent a public network that is owned and operated by a service provider to interconnect a plurality of networks, which may include access network 6. In some examples, SD-WAN 7 may implement Multi-Protocol Label Switching (MPLS) forwarding and in such instances may be referred to as an MPLS network or MPLS backbone. In some instances, SD-WAN 7 represents a plurality of interconnected autonomous systems, such as the Internet, that offers services from one or more service providers. Public network 12 may represent the Internet. Public network 12 may represent an edge network coupled to SD-WAN 7 via a transit network 22 and one or more network devices, e.g., a customer edge device such as customer edge switch or router. Public network 12 may include a data center. Router 8 may exchange packets with service nodes 10 via virtual network 20, and router 8 may forward packets to public network 12 via transit network 22.

In examples of network 2 that include a wireline/broadband access network, router 8 may represent a Broadband Network Gateway (BNG), Broadband Remote Access Server (BRAS), MPLS PE router, core router or gateway, or Cable Modem Termination System (CMTS). In examples of network 2 that include a cellular access network as access network 6, router 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to router 8 may be implemented in a switch, service card or another network element or component. In some examples, router 8 may itself be a service node.

A network service provider that administers at least parts of network 2 typically offers services to subscribers associated with devices, e.g., subscriber devices 16, that access SD-WAN system 2. Services offered may include, for example, traditional Internet access, VoIP, video and multimedia services, and security services. As described above with respect to SD-WAN 7, SD-WAN 7 may support multiple types of access network infrastructures that connect to service provider network access gateways to provide access to the offered services. In some instances, the network system may include subscriber devices 16 that attach to multiple different access networks 6 having varying architectures.

In general, any one or more of subscriber devices 16 may request authorization and data services by sending a session request to a gateway device such as SD-WAN appliance 18 or router 8. In turn, software-defined wide area network ("SD-WAN") appliance 18 may access a central server (not shown) such as an Authentication, Authorization and Accounting (AAA) server to authenticate the one of subscriber devices 16 requesting network access. Once authenticated, any of subscriber devices 16 may send subscriber data traffic toward SD-WAN 7 to access and receive services provided by public network 12, and such packets may traverse router 8 as part of at least one packet flow. In some examples, SD-WAN appliance 18 may forward all authenticated subscriber traffic to public network 12, and router 8 may apply services 15 and/or steer particular subscriber traffic to a data center 9 if the subscriber traffic requires services on service nodes 10. Applications (e.g., service applications) to be applied to the subscriber traffic may be hosted on service nodes 10.

For example, when forwarding subscriber traffic, router 8 may direct individual subscriber packet flows through services 15 executing on one or more service cards installed within router 9. In addition, or alternatively, SD-WAN system 2 includes a data center 9 having a cluster of service nodes 10 that provide an execution environment for the mostly virtualized network services. In some examples, each of service nodes 10 represents a service instance. Each of service nodes 10 may apply one or more services to traffic flows. As such, router 8 may steer subscriber packet flows through defined sets of services provided by service nodes 10. That is, in some examples, each subscriber packet flow may be forwarded through a particular ordered combination of services provided by service nodes 10, each ordered set being referred to herein as a "service chain." As examples, services 15 and/or service nodes 10 may apply stateful firewall (SFW) and security services, deep packet inspection (DPI), carrier grade network address translation (CGNAT), traffic destination function (TDF) services, media (voice/video) optimization, Internet Protocol security (IPSec)/virtual private network (VPN) services, hypertext transfer protocol (HTTP) filtering, counting, accounting, charging, and/or load balancing of packet flows, or other types of services applied to network traffic.

In the example of FIG. 1, subscriber packet flows may be directed along a service chain that includes any of services 15 and/or services applied by service nodes 10. Once processed at a terminal node of the service chain, i.e., the last service to be applied to packets flowing along a particular service path, the traffic may be directed to public network 12.

Whereas a "service chain" defines one or more services to be applied in a particular order to provide a composite service for application to packet flows bound to the service chain, a "service tunnel" or "service path" refers to a logical and/or physical path taken by packet flows processed by a service chain along with the forwarding state for forwarding packet flows according to the service chain ordering. Each service chain may be associated with a respective service tunnel, and packet flows associated with each subscriber device 16 flow along service tunnels in accordance with a service profile associated with the respective subscriber. For example, a given subscriber may be associated with a particular service profile, which in turn is mapped to a service tunnel associated with a particular service chain. Similarly, another subscriber may be associated with a different service profile, which in turn is mapped to a service tunnel associated with a different service chain. In some examples, after SD-WAN appliance 18 has authenticated and established access sessions for the subscribers, SD-WAN appliance 18 or router 8 may direct packet flows for the subscribers along the appropriate service tunnels, thereby causing data center 9 to apply the requisite ordered services for the given subscriber. In some examples, SDN controller 14 may also provide a forwarding rule set to SD-WAN appliance 18 or router 8 for managing the forwarding path. In some examples, SDN controller 14 manages the forwarding path through all elements in data center 9 starting at router 8.

In some examples, service nodes 10 may implement service chains using internally configured forwarding state that directs packets of the packet flow along the service chains for processing according to the identified set of service nodes 10. Such forwarding state may specify tunnel interfaces for tunneling between service nodes 10 using network tunnels such as IP or Generic Route Encapsulation (GRE) tunnels, Network Virtualization using GRE (NVGRE), or by using VLANs, Virtual Extensible LANs (VXLANs), MPLS techniques, and so forth. In some instances, real or virtual switches, routers or other network elements that interconnect service nodes 10 may be configured to direct the packet flow to the service nodes 10 according to service chains.

In the example of FIG. 1, SD-WAN system 2 comprises a software defined network (SDN) and network functions virtualization (NFV) architecture. SDN controller device 14 may provide a high-level controller for configuring and managing the routing and switching infrastructure of SD-WAN system 2. While some instances described herein relate to SD-WAN appliance 18 performing the edge-based routing techniques described herein, SDN controller 14 may also perform these techniques for SD-WAN system 2. NFV orchestrator device 13 may provide a high-level orchestrator for configuring and managing virtualization of network services into service nodes 10 of data center 9. In some instances, SDN controller 14 manages deployment of virtual machines (VMs) within the operating environment of data center 9. For example, SDN controller 14 may interact with provider edge (PE) router 8 to specify service chain information, described in more detail below. For example, the service chain information provided by SDN controller 14 may specify any combination and ordering of services provided by service nodes 10, traffic engineering information for tunneling or otherwise transporting packet flows along service paths, rate limits, Type of Service (TOS) markings or packet classifiers that specify criteria for matching packet flows to a particular service chain. Further example details of an SDN controller are described in PCT International Patent Application PCT/US13/44378, filed Jun. 5, 2013, the entire content of which is incorporated herein by reference.

Although illustrated as part of data center 9, service nodes 10 may be network devices coupled by one or more switches or virtual switches of SD-WAN 7. In one example, each of service nodes 10 may run as VMs in a virtual compute environment. Moreover, the compute environment may comprise a scalable cluster of general computing devices, such as x86 processor-based servers. As another example, service nodes 10 may comprise a combination of general purpose computing devices and special purpose appliances. As virtualized network services, individual network services provided by service nodes 10 can scale just as in a modern data center through the allocation of virtualized memory, processor utilization, storage and network policies, as well as horizontally by adding additional load-balanced VMs. In other examples, service nodes 10 may be gateway devices or other routers. In further examples, the functionality described with respect to each of service nodes 10 may be implemented in a switch, service card, or another network element or component.

As described herein, elements within SD-WAN system 2, such as SD-WAN appliance 18, may perform application data monitoring using various application quality of experience (QoE) metric functions, such as real-time performance monitoring (RPM) or two-way active measurement protocol (TWAMP), for example. That is, RPM and TWAMP may be used within SD-WAN system 2 to measure both one-way and two-way or round-trip metrics of network performance, such as path connectivity, path delay, packet jitter, packet loss, packet re-ordering, and the like, e.g., on a per-subscriber basis between network devices, also referred to as hosts or endpoints. In general, a QoE measurement architecture includes network devices that each support the used protocol and perform specific roles to start data sessions and exchange test packets for the data sessions. In the example network architecture illustrated in FIG. 1, SD-WAN appliance 18 is configured to perform the QoE metric predictions. SD-WAN appliance 18 allows for load sharing across connections and adjusts traffic flows based on network conditions to improve performance. Although only a single SD-WAN appliance 18 is shown in FIG. 1, in some examples system 2 may include multiple SD-WAN appliances.

Example QoE metric functions include active or synthetic probing performed by SD-WAN appliance 18. Active or synthetic probing results in additional traffic, which also varies based on the network topology and type of packet (e.g., Internet Control Message Protocol (ICMP), User Datagram Protocol (UDP), Transmission Control Protocol (TCP), Hypertext Transfer Protocol (HTTP), HTTP Secure (HTTPS), or an application specific probe). This would mean that on a customer-premises equipment (CPE) kind of deployment, the CPE (e.g., CE 11) may endure a considerable amount of these probe packets flooding the network. This situation can be worse in the case of a full mesh network topology where there may be multiple paths to traverse from one point to another. As the probes are scattered across the network, there may not be any centralized management.

Further, network administrators may need to configure these probe packets. Complex network topologies may produce many redundant probes in these networks. Worsening this issue, duplicate probes could originate from different VPNs of the same CPE device. Such an intent based configuration as the techniques described herein may provide reliable measurements and may avoid duplication of data. Implementing the techniques described herein by a cloud-based controller may optimally use a combination of active and passive probes, optimally manage the probes, and avoid redundant probes.

The techniques described herein may distribute the probes in the case of a complex network topology. The techniques described herein may also provide a cloud-based correlation of probes. The techniques may also provide a centralized aggregation of probes that are easier to plan and manage. Further, the techniques described herein may be highly available and use a fault tolerant management system, leveraging existing functionalities.

SD-WAN appliance 18, which performs the edge-based routing algorithms, also determine QoE metrics, such as service level agreement (SLA) metrics that include round-trip time (RTT), jitter, and packet loss, which were influenced by applications' real-time parameters like packet size, queues and burst of packets to determine the best path. While some instances described herein relate to SDN controller 14 performing the edge-based routing techniques described herein, SD-WAN appliance 18 may also perform these techniques for SD-WAN system 2.

Rather than measuring QoE metrics bi-directionally for every link between nodes and for every shortest path between two nodes of service nodes 10 in the network, SDN controller 14 may control each of service nodes 10 to only measure various QoE metrics for each edge between nodes uni-directionally. Further, SDN controller 14 may avoid redundant probes by aggregating the uni-directionally computed QoE metrics to determine QoE metrics for complex paths consisting of multiple edges or for the reverse flow of data across the edges. Active or synthetic probing results in additional traffic, which also varies based on the network topology and type of packet. This situation can be worse in the case of a full mesh network topology where there may be multiple paths to traverse from one point to another. As described below with respect to FIGS. 3-8, the techniques described herein allow SDN controller 14 (or SD-WAN appliance 18) to implement edge-based routing to more accurately measure the various QoE metrics in the network while limiting the number of probes injected into the system.

In accordance with the techniques described herein, SDN controller 14 may be a cloud controller for SD-WAN system 2, coordinating and mapping probing processes across SD-WAN system 2. For instance, SDN controller 14 may construct, for SD-WAN system 2 that includes a plurality of node devices (e.g., subscriber devices 16 and service nodes 10), a topological representation of SD-WAN system 2. The topological representation may take any form (e.g., a matrix, a database, a graphic, text, or any other data structure) that provides an indication of each of the node devices and an indication of each link of a plurality of links, where each link connects two of the node devices.

In the example of FIG. 1, SN controller 14 may be creating the topological representation of any number of the networks described in SD-WAN system 2. For instance, the topological representation could be of CEs 11 in access network 6, of subscriber devices 16, of one or more instances of SD-WAN appliance 18 in SD-WAN 7, or any combination thereof in an SDN system (e.g., SD-WAN system 2).

For each of the plurality of links, SDN controller 14 may select, based on the topological representation of the network, a node device of the two node devices connected by the respective link to measure one or more quality of experience (QoE) metrics for the respective link. As a result, the non-selected node device does not measure the QoE metrics for the respective link, meaning that only the selected node device will perform the active or synthetic probing functions for the respective link. In response to selecting the selected node device to measure the one or more QoE metrics for the respective link, SDN controller 14 may receive, from the selected node device, a set of one or more QoE metrics for the respective link. This set of one or more QoE metrics would indicate QoE metrics for data flows flowing from the selected node device to the non-selected node device. SDN controller 14 may store the set of QoE metrics for the respective link in a database, such that the QoE metrics for this link may be referenced in further extrapolations and estimations for other links and/or the reverse direction for the link. For instance, SDN controller 14 may determine, based on the set of one or more QoE metrics for the respective link, a set of one or more counter QoE metrics indicating QoE metrics for data flows flowing from the non-selected node device to the selected node device.

Ultimately, these techniques may enable SDN controller 14 to create a dynamic representation of the QoE metrics for each link and each possible connection, in all directions, in a database. For instance, SDN controller 14 may store the received measurements for each link in the database. Then, for each extrapolation/estimation (e.g., for each reverse direction of the received QoE metrics, for each logical path connecting two node devices also connected by a link, and for each complex path that is a shortest path between two node devices not connected directly by a link), SDN controller 14 may store the respective counter QoE metrics in the database. This information may be updated as new metrics are received by SDN controller 14. With this information, whenever SDN controller 14 must make a routing decision for application traffic or for traffic between nodes, SDN controller 14 may reference the database and the QoE metrics stored within the database to make routing decisions for the traffic within the network.

SDN controller 14 may extrapolate these QoE metrics further than simply the reverse direction for the link. In some examples, SDN controller 14 may also estimate QoE metrics for different logical paths, such as virtual private networks (VPNs), between two node devices where a physical link is already being measured. Further, for a complex path consisting of multiple links, SDN controller 14 may estimate QoE metrics for the complex path by taking a combination of the QoE metrics previously measured on the links making up the complex path.

In some examples, the metrics carried by QoE probe packets may include one or more of timestamps for sending or receiving a test packet, error estimates for sending or receiving the test packet, a sequence number for sending the test packet, a time-to-live (TTL) value for the test packet, a keepalive packet data unit (PDU), and/or a count of serviced packets, bytes, or subscribers. The one-way and two-way network performance measurements may include keepalive or path connectivity, round trip time (RTT), path delay, packet jitter, packet re-ordering, packet loss, service latency measurements, or service load measurements based on the received metrics.

Figure 2:
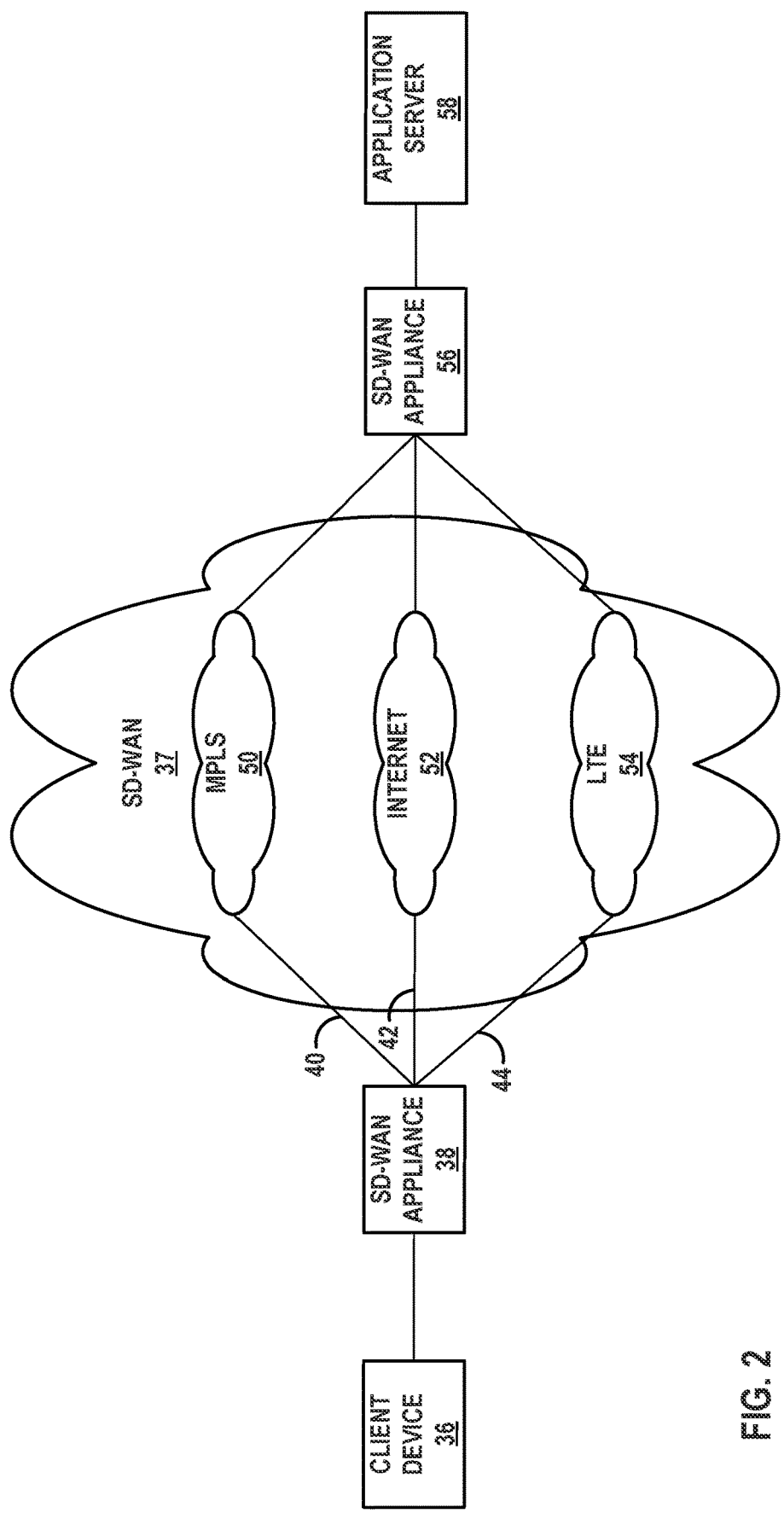
FIG. 2 is a block diagram illustrating an example software-defined wide area network, in accordance with one or more techniques of this disclosure.

FIG. 2 is a block diagram illustrating an example SD-WAN 37, in accordance with one or more techniques of this disclosure. In the example described herein, SD-WAN 7 includes three different WAN links: a first WAN link 40 coupling SD-WAN appliance 38 to a Multi-Protocol Layer Switching (MPLS) network 50, a second WAN link 42 coupling SD-WAN appliance 38 to Internet 52, and a third WAN link 44 coupling SD-WAN appliance 38 to long-term evolution (LTE) network 54. In other examples, SD-WAN 7 may include any number of links of any suitable type for transmitting data flows between the client side (e.g., client device 36 and SD-WAN appliance 38) and the application side (e.g., SD-WAN appliance 56 and application server 58).

Figure 3:
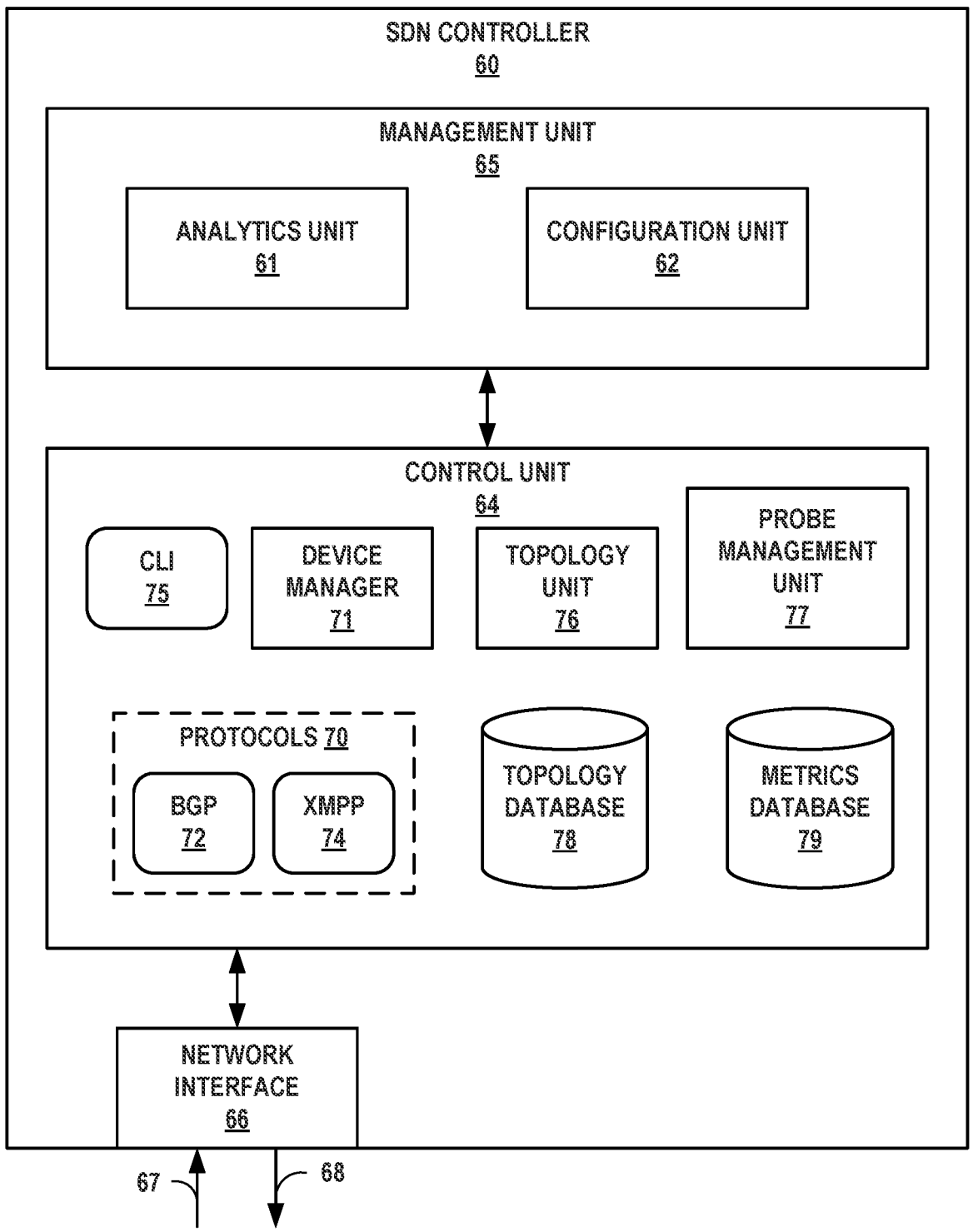
FIG. 3 is a block diagram illustrating an example software-defined wide area network controller configured to execute one or more functions to perform edge-based routing techniques, in accordance with the techniques of this disclosure.

FIG. 3 is a block diagram illustrating the example SDN controller 14 of FIG. 1 configured to implement the techniques described herein. In the example of FIG. 3, SDN controller 60 creates a topological representation of the network that contains or is managed by SDN controller 60 in order to efficiently create an overall process for probing the various links within the network. SDN controller 60 may operate as a network services controller for a service provider network. In the illustrated example of FIG. 3, SDN controller 60 includes a management unit 65, a control unit 64 for controlling operation of SDN controller 60, and a network interface 66 for exchanging packets with network devices by inbound link 67 and outbound link 68.

In some examples, control unit 64 and/or management unit 65 may be implemented as one or more processes executing on one or more virtual machines of one or more physical computing devices. That is, while generally illustrated and described as executing on a single SDN controller 60, aspects of each of these units may be delegated to or distributed across other computing devices.

Each of control unit 64 and/or management unit 65 may include one or more processors (not shown) that execute software instructions, such as those used to define a software or computer program, stored to a computer-readable storage medium (not shown), such as non-transitory computer-readable mediums including a storage device (e.g., a disk drive, or an optical drive) or a memory (such as Flash memory or RAM) or any other type of volatile or non-volatile memory, that stores instructions to cause the one or more processors to perform the techniques described herein. Alternatively, or additionally, each of control unit 64 and/or management unit 65 may comprise dedicated hardware, such as one or more integrated circuits, one or more application-specific integrated circuits (ASICs), one or more Application Specific Special Processors (ASSPs), one or more FPGAs, or any combination of one or more of the foregoing examples of dedicated hardware, for performing the techniques described herein. The architecture of SDN controller 60 illustrated in FIG. 3 is shown for example purposes only and should not be limited to this architecture. In other examples, SDN controller 60 may be implemented in a variety of ways, such software only, hardware only, or a combination of both software and hardware.

Management unit 65 may comprise a management layer of SDN controller 60, whereas control unit 64 may comprise a control layer of SDN controller 60. Management unit 65 includes an analytics unit 61 and a configuration unit 62. Analytics unit 61 may capture information from physical and/or virtual network elements within SD-WAN system 2, e.g., a gateway, service nodes 10, or of each data center 9 of FIG. 1, and analyze the information for use in managing the network services offered by the service provider. The information may include statistics, logs, events, and errors.

Configuration unit 62 stores configuration information for the network elements within SD-WAN system 2. In some examples, the configuration information comprises a virtual network configuration. Configuration unit 62 may translate a high-level data model of the intended virtual network configuration to a lower-level data model for use in interacting with the network elements.

Control unit 64 of SDN controller 60 implements a centralized control plane for SD-WAN system 2 that is responsible for maintaining a constantly changing network state. Control unit 64 interacts with the network elements within SD-WAN system 2 to maintain a consistent network state across all of the network elements. Control unit 64 provides an operating environment for a command line interface daemon 75 ("CLI 75") that provides an interface by which an administrator or other management entity may modify the configuration of SDN controller 60 using text-based commands. Control unit 64 also provides an operating environment for several protocols 70, including Border Gateway Protocol (BGP) 72 and Extensible Messaging and Presence Protocol (XMPP) 74 as illustrated in the example of FIG. 3. In accordance with the techniques described herein, these commands may alter which QoE metrics are to be measured, how SDN controller 60 constructs the topology of the network, and whether SDN controller 60 optimizes the distribution of the probing processes being performed across the node devices. The user configuration (e.g., intent-based configuration) may also configure the probes themselves, providing instructions as to whether the probes are active probes, passive probes, or a combination thereof.

In some examples, control unit 64 uses XMPP 74 to communicate with network elements within SD-WAN system 2, such as gateways 8, client devices 16, or service nodes 10 of data center 9 within SD-WAN system 2 of FIG. 1, by an XMPP interface (not shown). Virtual network route data, statistics collection, logs, and configuration information may be sent as extensible markup language (XML) documents in accordance with XMPP 74 for communication between SDN controller 60 and the network elements. Control unit 64 may also use XMPP 74 to communicate with one or both of analytics unit 61 and configuration unit 62 of SDN controller 60.

Control unit 64 further includes device manager 71 topology unit 76, probe management unit 77, topology database 78, and metric database 79, which enables control unit 64 to construct a topological representation of the nodes, links, and probing processes to develop a full probing plan across the topology of the network. In accordance with the techniques described herein, SDN controller 60 may be a cloud controller for a network, coordinating and mapping probing processes across the network. For instance, topology unit 76 may construct, for the network that includes a plurality of node devices (e.g., subscriber devices and service nodes), a topological representation of the network. The topological representation may take any form (e.g., a matrix, a database, a graphic, text, or any other data structure) that provides an indication of each of the node devices and an indication of each link of a plurality of links, where each link connects two of the node devices. The topological representation may be stored in topology database 78.

In some examples, topology unit 76 may translate high-level data models associated with a topology of the network into lower-level models suitable for interacting with network elements or devices, such as the network devices shown in FIGS. 1 and 2. In some cases, topology unit 76 may receive, via network interface 66, high-level data models (e.g., user intent-based network or data models) from an orchestration engine and/or an administrator. These models may be associated with a topology of a network. Topology unit 76 may use these models and intent to construct the topological representation to store within topology database 78.

In constructing the topological representation of the network, topology unit 76 may monitor one or more probe packets sent over each of the plurality of links. For instance, when the techniques described herein are first applied to the network, each node device may be sending probe packets over each of the node device's respective links. However, topology unit 76 may not inherently possess a data structure that depicts which node devices are in the network, and which other node devices each node device is linked to. By monitoring the various probe packets sent across the network, topology unit 76 may populate a data structure, such as an adjacency matrix, with an indication of which node devices are in the network, and which other node devices each node device is sending probe packets too. As the network may be configured such that each node device is performing the probing function for each link connected to the node device, this monitoring function would provide topology unit 76 with a complete representation of the various connections within the network, and topology unit 76 may use graph theory to derive the topological representation of the various node devices and links within the network.

For each of the plurality of links, probe management unit 77 may select, based on the topological representation of the network, a node device of the two node devices connected by the respective link to measure one or more QoE metrics for the respective link. As a result, the non-selected node device does not measure the QoE metrics for the respective link, meaning that only the selected node device will perform the active or synthetic probing functions for the respective link.

In selecting the node device of the two node devices connected by the respective link to measure the QoE metrics for the respective link, probe management unit 77 may instruct the selected node device of the two node devices connected by the respective link to send one or more probe packets over the respective link. In other examples, the node devices may automatically be configured to send the one or more probe packets over the respective links for the node devices. In such instances, rather than actively instructing the selected node devices to measure the QoE metrics for the respective link, probe management unit 77 may instead instruct the non-selected node device of the two node devices to refrain from sending any additional probe packets over the respective link, thereby actively instructing the non-selected node to not measure the QoE metrics.

In an effort to optimize the efficiency of the overall system described herein, probe management unit 77 may select the node devices such that the probing processes are as evenly distributed across the node devices as possible. In other words, if two node devices are connected by a link, the node device of the two node devices that is responsible for probing fewer links may be better situated to handle the probing for the current link. As such, when selecting the node devices for probing on respective links, probe management unit 77 may perform an optimization algorithm. For each node device of the plurality of node devices, probe management unit 77 may examine each link of the plurality of links that includes the respective node device. For each link of the plurality of links that includes the respective node device probe management unit 77 may determine whether the second node device connected to the respective node device by the respective link is configured to probe a total number of links less than or equal to a total number of links being probed by the respective node device. Responsive to determining that the second node device connected to the respective node device by the respective link is sending the total number of probes less than or equal to the total number of links being probed by the respective node device, probe management unit 77 may select the respective node device to refrain from sending further probe packets to the second node device connected to the respective node device by the respective link over the respective link.

Probe management unit 77 may continue iterating through the node devices and links in this manner until every link has only a single selected node device, or until the system is optimized and cycling through the node devices in this manner would not alter the overall probing plan. For instance, while there exist links in the plurality of links for which each node device connected by the respective link is sending a probe packet over the respective link, probe management unit 77 may select a singular node device of the node devices connected by the respective link refrain from probing the respective link based on the total number of links being probed by each node device connected by the respective link.

In determining which node device is probing fewer links, probe management unit 77 may use the topological representation in the form of an adjacency matrix. When probe management unit 77 selects the node device of the two node devices connected by the respective link, probe management unit 77 may determine, based on the adjacency matrix that indicates which node devices of the plurality of node devices are sending probe packets and how many links each node device is measuring a respective set of one or more QoE metrics for, which node device of the two node devices is measuring the respective sets of one or more QoE metrics for fewer links. Probe management unit 77 could determine this by calculating a sum of a column/row in the matrix for associated with the node devices in question and comparing the sums. Once probe management unit 77 selects one of the node devices, probe management unit 77 may update the adjacency matrix such that the sum of column/row for the non-selected node would be reduced by 1.

Although the above functions may be part of an initialization technique at the beginning of implementing the techniques described herein, these techniques may be repeated when new node devices enter the network. SD-WANs are dynamic in nature, and node devices may enter or leave the network at any time. This means that links are created and removed from the system throughout the existence of the SD-WAN. As such, topology unit 76 and probe management unit 77 may be configured to repeat the processes described herein whenever a new node device enters the system or whenever a current node device leaves the system.

For instance, topology unit 76 may determine that a new node device has entered the network, adding the new node to topology data 78. By the very nature of entering the network, the new node device may be connected to at least one node device of the plurality of node devices via at least one new link. For each new link of the at least one new link, probe management unit 77 may determine whether the node device connected to the new node device by the respective new link is configured to probe a total number of links less than or equal to the total number of links being probed by the new node device. Responsive to determining that the node device connected to the new node device by the respective new link is probing the total number of links less than or equal to the total number of links being probed by the new node device, probe management unit 77 may select the new node device to refrain from sending further probe packets to the node device connected to the new node device by the respective new link over the respective new link. Conversely, responsive to determining that the node device connected to the new node device by the respective new link is probing the total number of links greater than the total number of links being probed by the new node device, probe management unit 77 may select the node device connected to the new node device over the respective new link to refrain from sending further probe packets to the new node device over the respective new link. Similar repetitions of the optimization functions may be applied when node devices leave the network, as some node devices that remain in the network may be more greatly effected by a node device leaving than others due to the links associated with the exiting node device.

In response to selecting the selected node device to measure the one or more QoE metrics for the respective link, probe management unit 77 may receive, from the selected node device, a set of one or more QoE metrics for the respective link. This set of one or more QoE metrics would indicate QoE metrics for data flows flowing from the selected node device to the non-selected node device. Probe management unit 77 may store the set of QoE metrics for the respective link in metric database 79, such that the QoE metrics for this link may be referenced in further extrapolations and estimations for other links and/or the reverse direction for the link. For instance, probe management unit 77 may determine, based on the set of one or more QoE metrics for the respective link, a set of one or more counter QoE metrics indicating QoE metrics for data flows flowing from the non-selected node device to the selected node device.

While the above describes probe management unit 77 using the QoE metrics for a link to estimate the reverse direction QoE metrics for the link, probe management unit 77 may use these QoE metrics for other determinations as well. For instance, probe management unit 77 may use the determined QoE metrics for each of the links to determine QoE metrics for more complex paths that include multiple links, e.g., for nodes that are not directly connected to one another. Probe management unit 77 may determine a path that includes a combination of a first link of the plurality of links and a second link of the plurality of links, where the first link connects a first node device of the plurality of node devices and a second node device of the plurality of node devices. The second link connects the second node device of the plurality of node devices and a third node device of the plurality of node devices. As this path may be the shortest path between the first node device and the third node device, the first node device of the plurality of node devices and the third node device of the plurality of node devices may not be directly connected by any link of the plurality of links. As such, probe management unit 77 may retrieve a set of one or more QoE metrics for the first link and a set of one or more QoE metrics for the second link, and use these retrieved QoE metrics to estimate a set of one or more QoE metrics for the path.

Probe management unit 77 may also extend these techniques for logical paths connecting two node devices that are already connected by a link. For instance, for a first link of the plurality of links that connects a first node device of the plurality of node devices and a second node device of the plurality of node devices, probe management unit 77 may estimate, based on the set of one or more QoE metrics for the first link stored in metrics database 79, a set of one or more QoE metrics for a logical path connecting the first node device and the second node device. While the logical path may be a different connection than the first link, similar physical hardware may be used in this connection between the two node devices. As such, QoE metrics for the logical path may ultimately be similar to the QoE metrics for the measured link. As such, while the measurement may not be exact, this estimation may still provide reliable QoE metrics for the logical path without using additional resources to send additional probe packets over the logical path.

Device manager 75 may generate vendor-agnostic device information based on the inputs provided by topology database 78 and metrics database 79. Vendor-agnostic device information may also be referred to as device abstract configuration information. Vendor-agnostic device information is agnostic, per-device configuration information for each individual network device in a network. In some examples, vendor-agnostic device information may comprise Extensible Markup Language (XML) schema or Yet Another Next Generation (YANG) schema information.

SDN controller 60 may then utilize device manager 75 to implement one or more translation processes to translate vendor-agnostic device information into vendor-specific device information. Vendor-specific device information may also be referred to as vendor specific, or concrete, device configuration information. Each individual network device in the network may have both vendor-agnostic device information and vendor-specific device information. In some examples, vendor-specific device information may be customizable via the use, e.g., of Jinja2 templates for each different vendor.

Figure 4:
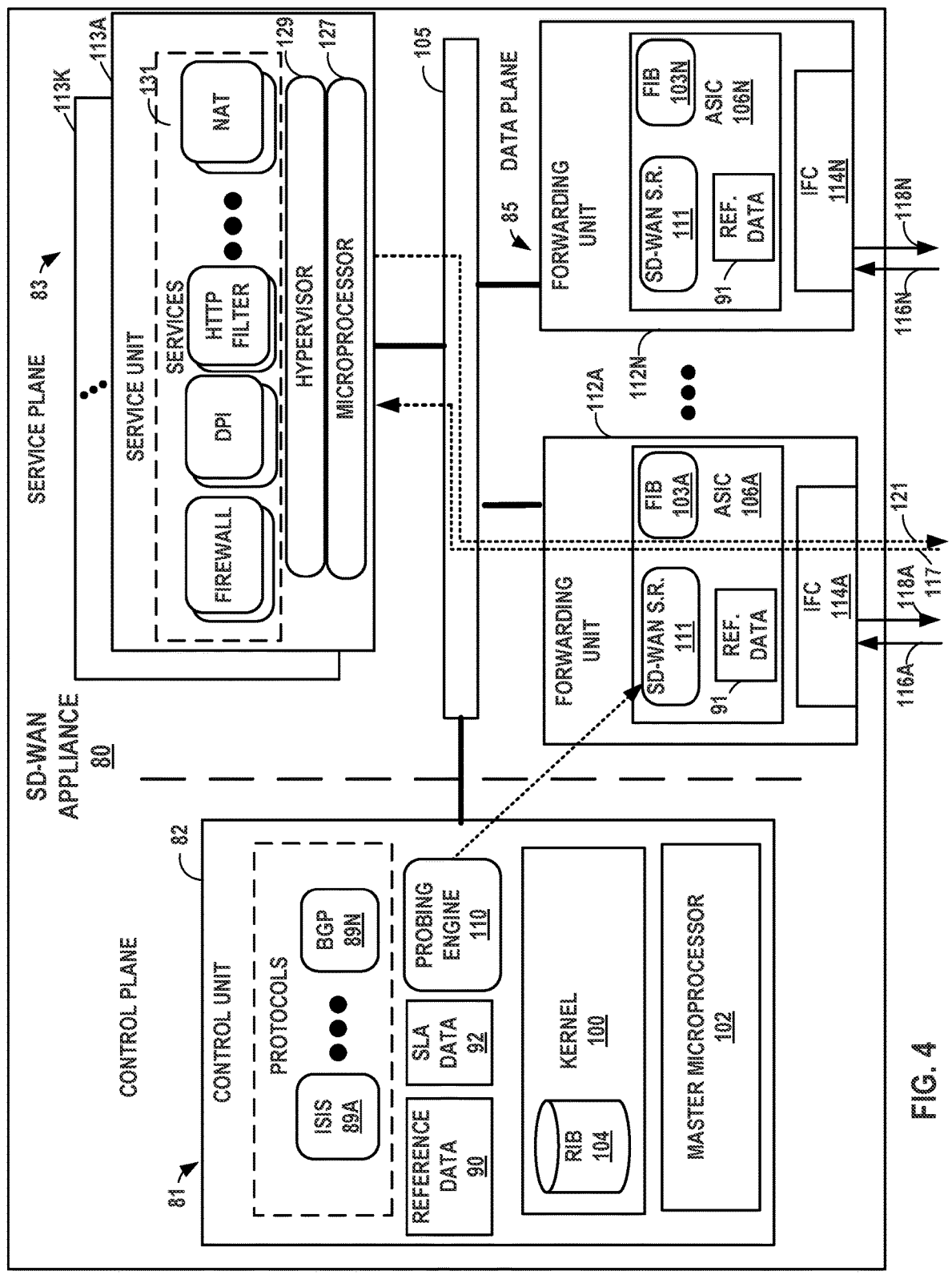
FIG. 4 is a block diagram illustrating an example software-defined wide area network appliance configured to execute one or more functions to perform edge-based routing techniques, in accordance with the techniques of this disclosure.

As a result, device manager 75 may be configured to generate both vendor-agnostic device information and vendor-specific device information in the manner illustrated in FIG. 4. Vendor-agnostic device information may include vendor-agnostic device configuration and/or command information (e.g., entered via CLI 75 or other management interface), and vendor-specific device information may include vendor-specific device configuration and/or command information, as well (e.g., sent via network interface 66 and/or via protocols 70). SDN controller 60 illustrated in FIG. 4 may send vendor-specific device information to individual network devices for which the vendor-specific device information has been generated. For example, SDN controller 60 may provide vendor-specific device configuration information to a network device via a configuration interface, and may provide vendor-specific device command information to a network device via a command interface. In this example, vendor-specific device configuration information and vendor-specific device command information may each be included in vendor-specific device information, which is translated from vendor-agnostic device information. Additional information regarding translation of high-level configuration instructions to low-level device configuration can be found in U.S. patent application Ser. No.

15/198,657, filed Jun. 30, 2016, and entitled TRANSLATING HIGH-LEVEL CONFIGURATION INSTRUCTIONS TO LOW-LEVEL DEVICE CONFIGURATION, which is hereby incorporated by reference.

These techniques may enable probe management unit 77 to create a dynamic representation of the QoE metrics for each link and each possible connection, in all directions, in topology database 78 and metrics database 79. For instance, probe management unit 77 may store the received measurements for each link in metrics database 79. Then, for each extrapolation/estimation (e.g., for each reverse direction of the received QoE metrics, for each logical path connecting two node devices also connected by a link, and for each complex path that is a shortest path between two node devices not connected directly by a link) indicated in topology database 78, probe management unit 77 may store the respective estimated QoE metrics in metrics database 79. This information may be updated as new metrics are received by probe management unit 77. With this information, whenever SDN controller 60 must make a routing decision for application traffic or for traffic between nodes, SDN controller 60 may reference topology database 78 and the QoE metrics stored within metrics database 79 to make routing decisions for the traffic within the network.

There may be one or more advantages to using the techniques described herein. While the actual metrics may not be exact in all situations, a particular link will generally have similar QoE metrics in each direction. Similarly, when sending probe packets over a complex path consisting of multiple links, while the QoE metrics may not exactly be a combination of the links that make up the complex path, taking a combination of the QoE metrics across each link may still provide accurate estimates of the QoE metrics for the path. As such, estimating the QoE metrics for various links between node devices in the manner described by the techniques of this disclosure may greatly reduce the bandwidth and other resources consumed by the node devices in an effort to reliably generate QoE metrics for the entire network. As node devices have fewer probe packets to generate and process, this may also increase the efficiency of each individual node device, including reducing central processing unit (CPU) usage, memory using, and power consumption for each individual node device.

FIG. 4 is a block diagram illustrating an example network device configured to execute one or more functions to perform edge-based routing techniques, in accordance with the techniques of this disclosure. While the network device may be any network device configured to perform the techniques described herein, the network device may be an example of SD-WAN appliance 18 of FIG. 1 or SD-WAN appliance 38 of FIG. 2. SD-WAN appliance 80 may be described herein within the context of SD-WAN system 2 of FIG. 1, and may represent any of routers 8 or SD-WAN appliance 18, for example. Moreover, while described with respect to a particular network device, e.g., a router or SD-WAN appliance, the techniques may be implemented by any network device that may operate as an SD-WAN appliance, such as a client device, a Layer 3 (L3) or L2/L3 switch, or server.

In this example, SD-WAN appliance 80 is divided into three logical or physical "planes" to include a control plane 81 that performs control operations for the device, a data plane 85 for forwarding transit network traffic and a service plane 83 for application of one or more network services 87 to transit packet flows that are forwarded by the router. That is, router 81 implements three separate functionalities (e.g., the routing/control, forwarding data and network service functionalities), either logically, e.g., as separate software instances executing on the same set of hardware components, or physically, e.g., as separate physical dedicated hardware components that either statically implement the functionality in hardware or dynamically execute software or a computer program to implement the functionality. In this example, a high-speed internal switch fabric 105 couples control plane 81, service plane 83, and data plane 85 to deliver data units and control messages among the units. Switch fabric 105 may represent an internal switch fabric or cross-bar, bus, or link.

In the example of FIG. 4, control plane 81 includes control unit 82 having master microprocessor(s) 102, which executes device management services, subscriber authentication and control plane routing functionality of SD-WAN appliance 80. Microprocessor 102 may comprise one or more general- or special-purpose processors such as a digital signal processor (DSP), an ASIC, a field programmable gate array (FPGA), or any other equivalent logic device. Accordingly, the terms "processor" or "controller," as used herein, may refer to any one or more of the foregoing structures or any other structure operable to perform techniques described herein. Executables, such as probing engine 110, may be operable by microprocessor 102 to perform various actions, operations, or functions of SD-WAN appliance 80. For example, microprocessor 102 of SD-WAN appliance 80 may retrieve and execute instructions stored by various data stores that cause microprocessor 102 to perform the operations of probing engine 110.

One or more storage components (e.g., RIB 104) within SD-WAN appliance 80 may store information for processing during operation of SD-WAN appliance 80 (e.g., SD-WAN appliance 80 may store data accessed by probing engine 110 during execution at SD-WAN appliance 80). In some examples, the storage component is a temporary memory, meaning that a primary purpose of the storage component is not long-term storage. Storage components on SD-WAN appliance 80 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components, in some examples, also include one or more computer-readable storage media. Storage components in some examples include one or more non-transitory computer-readable storage mediums. Storage components may be configured to store larger amounts of information than typically stored by volatile memory. Storage components may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components may store program instructions and/or information (e.g., data) associated with probing engine 110. Storage components 248 may include a memory configured to store data or other information associated with probing engine 110.

In some examples, probing engine 110 may be configured to perform one or more aspects of the various techniques described herein. As shown herein, probing engine 110 may be implemented as a component of control unit 82 in the control plane. However, in other implementations, probing engine 110 may be a standalone component of a network device distinct and physically separate from SD-WAN appliance 80 and outside of any of the planes defined in SD-WAN appliance 80, assessing the received data traffic outside of the control plane, data plane, and service plane. In such instances, control unit 82 may replicate application packets as they are received, sending the original instances of the application traffic to one of forwarding units 112 and sending the replicated application traffic to probing engine 110 to evaluate separately from the regular data flow.

In general, control unit 82 represents hardware or a combination of hardware and software of control that implements control plane protocols 89A-89N ("routing protocols 89") to learn and maintain routing information within routing information base 104 ("RIB 104"). RIB 104 may include information defining a topology of a network, such as service provider network of FIG. 1. Routing protocols 89 interact with kernel 100 (e.g., by way of API calls) executing on control unit 82 to update RIB 104 based on routing protocol messages received by SD-WAN appliance 80. Kernel 100 may resolve the topology defined by routing information in RIB 104 to select or determine one or more routes through the network. For example, the kernel may generate forwarding information in the form of forwarding information bases 103A-103N ("FIBs 103") based on the network topology represented in RIB 104, i.e., perform route resolution. Typically, kernel 100 generates FIBs 103 in the form of radix or other lookup trees to map packet information (e.g., header information having destination information and/or a label stack) to next hops and ultimately to interface ports of IFCs 114 associated with respective forwarding units 112. Each of FIBs 103 may associate, for example, network destinations with specific next hops and corresponding IFCs 114. For MPLS-related traffic forwarding, FIBs 103 stores, for a given FEC, label information that includes an incoming label, an outgoing label, and a next hop for a packet. Control unit 82 may then program forwarding units 112 of data plane 85 with FIBs 103, which installs the FIBs within lookup ASICs 106.

Data plane 85, in this example, is a decentralized data plane in that data plane functionality and packet forwarding functionality is distributed among a plurality of forwarding units 112A-112N ("forwarding units 112"). In the example of SD-WAN appliance 80, data plane 85 includes forwarding units 112 that provide high-speed forwarding of network traffic received by interface cards 114A-114N ("IFCs 44") via inbound links 116A-116N to outbound links 118A-118N. Forwarding units 112 may each comprise one or more packet forwarding engine ("PFE") coupled to respective interface cards 114 and may represent, for example, a dense port concentrator (DPC), modular port concentrator (MPC), flexible physical interface card (PIC) concentrator (FPC), or another line card, for example, that is insertable within a chassis or combination of chassis of SD-WAN appliance 80.

As shown in the example of FIG. 3, each of forwarding units 112 includes a respective one of lookup ASICs 106A-106N ("lookup ASICs 106") that receives control and data session traffic via IFC cards 114, performs route lookups and, based on routes installed to FIBs 103, forwards the traffic either to control unit 82 (control traffic destined for SD-WAN appliance 80) or to one of forwarding units 40 (transit data traffic) for output via an interface to one of output links 48. In one example, lookup ASICs 106 are microcode-controlled chipsets programmably configured by a slave microprocessor (not shown) executing on each of forwarding units 112. Specifically, in this example, each of ASICs 106 may be controllable by internal microcode programmed by a slave microprocessor.

When forwarding packets, control logic within each lookup ASICs 106 traverses the respective FIB 103 and, upon reaching a FIB entry for the packet (e.g., a leaf node), the microcode-implemented control logic automatically selects one or more forwarding next hops (FNHs) for forwarding the packet. In this way, ASICs 106 of forwarding units 112 process packets by performing a series of operations on each packet over respective internal packet forwarding paths as the packets traverse the internal architecture of SD-WAN appliance 80. Operations may be performed, for example, on each packet based on any of a corresponding ingress interface, an ingress PFE 114, an egress PFE 114, an egress interface or other components of SD-WAN appliance 80 to which the packet is directed prior to egress, such as one or more service cards. Forwarding units 112 each include forwarding structures that, when executed, examine the contents of each packet (or another packet property, e.g., incoming interface) and on that basis make forwarding decisions, apply filters, and/or perform accounting, management, traffic analysis, and load balancing, for example.

In one example, each of forwarding units 112 arranges forwarding structures as next hop data that can be chained together as a series of "hops" along an internal packet forwarding path for the network device. In many instances, the forwarding structures perform lookup operations within internal memory of ASICs 106, where the lookup may be performed against a tree (or trie) search, a table (or index) search. Other example operations that may be specified with the next hops include filter determination and application, or a rate limiter determination and application. Lookup operations locate, within a lookup data structure (e.g., a lookup tree), an item that matches packet contents or another property of the packet or packet flow, such as the inbound interface of the packet. The result of packet processing in accordance with the operations defined by the next hop forwarding structure within ASICs 106 determines the manner in which a packet is forwarded or otherwise processed by forwarding units 112 from its input interface on one of IFCs 114 to its output interface on one of IFCs 114.

Lookup ASICs 106 may be implemented using forwarding application specific integrated circuits (ASICs), field programmable gate arrays (FPGAs), or any other equivalent integrated or discrete logic circuitry, as well as any combinations of such components. Each of forwarding units 112 may include substantially similar components to perform substantially similar functionality.

Service plane 83 of SD-WAN appliance 80 includes a plurality of service units 113A-113K ("service units 13") that may be, as examples, removable service cards, which are configured to apply network services to packets flowing through data plane 85. That is, when forwarding packets, forwarding units 112 may steer packets to service plane 83 for application of one or more network services 131 by service units 113. In this example, each of service units 113 includes a microprocessor 127 configured to execute hypervisor 129 to provide an operating environment for a plurality of network services 131. As examples, service units 113 may apply firewall and security services, carrier grade network address translation (CG-NAT), media optimization (voice/video), IPSec/VPN services, deep packet inspection (DPI 131A), HTTP filtering, counting, accounting, charging, and load balancing of packet flows or other types of services applied to network traffic. Each of services 131 may be implemented, for example, as virtual machines or containers executed by hypervisor 129 and microprocessor 127.

In the example of FIG. 4, control unit 82 provides an operating environment for probing engine 110. In some examples, control unit 82 may use probing engine 110 to execute one or more TWAMP or RPM logical roles, such as a control client, a server, a sessions sender, and a session reflector.

In accordance with the techniques described herein, probing engine 110 may receive instructions from an SDN controller (e.g., SDN controller 60) to probe, or to not probe, any of the one or more links that connects SD-WAN appliance 80 to another node device. Probing engine 110 may follow the instructions received, either performing a probing process to measure QoE metrics for a link connecting SD-WAN appliance 80 to another node device or refraining from performing the probing process. For the links that probing engine 110 does measure QoE metrics for, probing engine 110 may send the measured QoE metrics to the SDN controller. The SDN controller may aggregate these metrics from SD-WAN appliance 80 and other node devices in the network in accordance with the techniques described herein.

Probing engine 110 may also store the measured QoE metrics locally in reference database 90. Probing engine 110 may use the QoE metrics stored in reference database 90 and SLA metrics stored in SLA database 92 to assign application traffic flows to various links.

Figure 5:
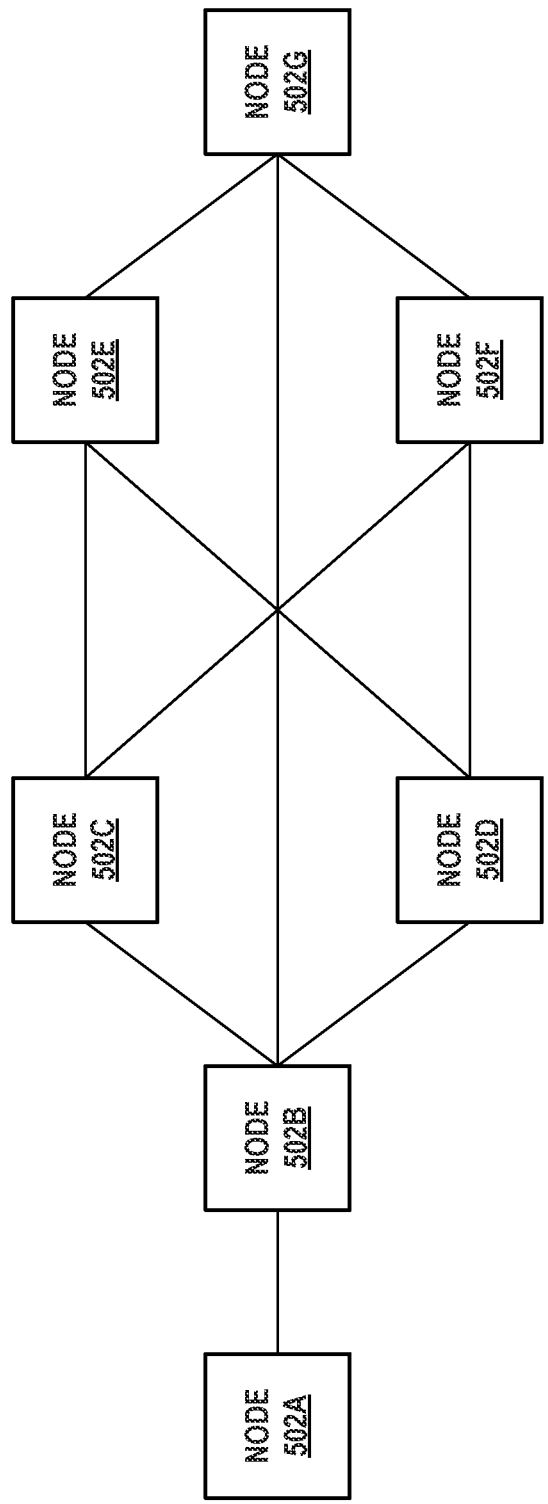
FIG. 5 is a conceptual flow diagram illustrating an example topology for a plurality of nodes in a software-defined wide area network system, in accordance with the techniques of this disclosure.

FIG. 5 is a conceptual flow diagram illustrating an example topology for a plurality of nodes 502A-502G in a software-defined wide area network system, in accordance with the techniques of this disclosure. Application probes play a vital role in measuring the performance of the network and to continuously verify that the links are able to meet the desired characteristics of the application packets. Probes could be active (e.g., synthetic packets resembling the application data packets) or passive (e.g., embedded probe headers in the live traffic) in nature. While the passive probes do not result in additional traffic, the packets need to be intercepted and processed, resulting in additional load as well as concerns on privacy and security. Synthetic probing relies on injecting test packets that mimics the actual application, thereby measuring the network performance. Network topology also is an important factor in planning and management for the network.

In the example of FIG. 5, nodes 502 may each be devices in a network configured to transmit data amongst one another over various links. For instance, nodes 502 may each be separate pieces of customer equipment in an access network (e.g., CE 11 in access network 6 of FIG. 1), separate subscriber devices within a network (e.g., subscriber devices 16 of FIG. 1), nodes in a data center (e.g., nodes 10 of data center 9 of FIG. 1), separate SD-WAN appliances in a SD-WAN (e.g., SD-WAN appliance 18 of FIG. 1), or any combination thereof in a SDN system (e.g., SD-WAN system 2 of FIG. 1). As such, FIG. 5 may be an example of a simplified network topology of SD-WAN 7 of FIG. 1, access network 6 of FIG. 1, or SD-WAN system 2 of FIG. 1.

An example of the techniques described herein to avoid redundant probes and probe duplication to reduce the traffic is described below with respect to FIG. 5. Consider the topology of node 502A and node 502B. If a probe is being sent from node 502A to node 502B, an SDN controller (e.g., SDN controller 14) may avoid running another probe from node 502B to node 502A and instead correlate the metrics collected on node 502A to take decisions on node 502B as well.

The SDN controller may also ensure uniform distribution across the network topology. In case of a complex full mesh, if there are N devices in full mesh, the worst case is that each device will run N−1 probes (N(N−1) probes in total) for a given protocol. Using the techniques described herein, this can be optimized to N(N−1)/2 total probes, and additionally distribute the load such that each device runs (N−1)/2 probes.

The techniques described herein also grant the SDN controller the ability to perform complex probing. Suppose the cloud controller receives configuration data requesting to determine QoE metrics for a path from node 502A to node 502C. If the cloud controller has already determined the QoE metrics between node 502A to node 502B and from node 502B to node 502C, the cloud controller may simply aggregate the QoE on each of these links to extrapolate the network behavior between node 502A to node 502C. The solution provided by the techniques described herein may assume device support for networking probes (such as RPM, application level probes etc.), as it may leverage existing configuration interfaces.

TABLE I

Adjacency Matrix(assuming single probe)

|   | A | B | C | D | E | F | G |
|---|---|---|---|---|---|---|---|
| A | 0 | 1 | 0 | 0 | 0 | 0 | 0 |
| B | 1 | 0 | 1 | 1 | 0 | 0 | 1 |
| C | 0 | 1 | 0 | 0 | 1 | 1 | 0 |
| D | 0 | 1 | 0 | 0 | 1 | 1 | 0 |
| E | 0 | 0 | 1 | 1 | 0 | 0 | 1 |
| F | 0 | 0 | 1 | 1 | 0 | 0 | 1 |
| G | 0 | 1 | 0 | 0 | 1 | 1 | 0 |

TABLE II

Raw distribution of probes from each of the Nodes

| A | B | C | D | E | F | G |
|---|---|---|---|---|---|---|
| 1 | 4 | 3 | 3 | 3 | 3 | 3 |

TABLE III

Optimized distribution

| A | B | C | D | E | F | G |
|---|---|---|---|---|---|---|
| 1 | 2 | 2 | 1 | 2 | 1 | 1 |

In an example of the distribution algorithm used in the techniques described herein, the cloud controller (e.g., SDN controller 14) may iterate through each of the nodes. For every node (e.g., node 502A), the cloud controller may loop through the adjacency nodes. As the top half of matrix is already optimized, the cloud controller may only look at the sub matrix below this node. If the adjacency node has equal or less load, the cloud controller may determine to not probe it. Otherwise, the cloud controller may clear the probe flag on the adjacent node. The cloud controller may continue to prune the probes from the device based on the re-distribution. In this way, the techniques described herein may utilize graph theory concepts in deriving the optimal distribution of probes throughout the system. In the case of multiple probes, the count may be reflected in an adjacency matrix.

TABLE IV

Sub-Matrix for Node A

|   | A | B | C | D | E | F | G |
|---|---|---|---|---|---|---|---|
| A | 0 | 1 | 0 | 0 | 0 | 0 | 0 |
| B | 1 | 0 | 1 | 1 | 0 | 0 | 1 |
| C | 0 | 1 | 0 | 0 | 1 | 1 | 0 |
| D | 0 | 1 | 0 | 0 | 1 | 1 | 0 |
| E | 0 | 0 | 1 | 1 | 0 | 0 | 1 |
| F | 0 | 0 | 1 | 1 | 0 | 0 | 1 |
| G | 0 | 1 | 0 | 0 | 1 | 1 | 0 |

TABLE V

Sub-Matrix for Node B

|   | A | B | C | D | E | F | G |
|---|---|---|---|---|---|---|---|
| A | 0 | 1 | 0 | 0 | 0 | 0 | 0 |
| B | 0 | 0 | 0 | 1 | 0 | 0 | 1 |
| C | 0 | 1 | 0 | 0 | 1 | 1 | 0 |
| D | 0 | 0 | 0 | 0 | 1 | 1 | 0 |
| E | 0 | 0 | 1 | 1 | 0 | 0 | 1 |
| F | 0 | 0 | 1 | 1 | 0 | 0 | 1 |
| G | 0 | 1 | 0 | 0 | 1 | 1 | 0 |

TABLE VI

Sub-Matrix for Node C

|   | A | B | C | D | E | F | G |
|---|---|---|---|---|---|---|---|
| A | 0 | 1 | 0 | 0 | 0 | 0 | 0 |
| B | 0 | 0 | 0 | 1 | 0 | 0 | 1 |
| C | 0 | 1 | 0 | 0 | 0 | 1 | 0 |
| D | 0 | 0 | 0 | 0 | 1 | 1 | 0 |
| E | 0 | 0 | 1 | 1 | 0 | 0 | 1 |
| F | 0 | 0 | 1 | 1 | 0 | 0 | 1 |
| G | 0 | 1 | 0 | 0 | 1 | 1 | 0 |

TABLE VII

Sub-Matrix for Node E

|   | A | B | C | D | E | F | G |
|---|---|---|---|---|---|---|---|
| A | 0 | 1 | 0 | 0 | 0 | 0 | 0 |
| B | 0 | 0 | 0 | 1 | 0 | 0 | 1 |
| C | 0 | 1 | 0 | 0 | 0 | 1 | 0 |
| D | 0 | 0 | 0 | 0 | 0 | 1 | 0 |
| E | 0 | 0 | 0 | 1 | 0 | 0 | 1 |
| F | 0 | 0 | 0 | 0 | 0 | 0 | 1 |
| G | 0 | 0 | 0 | 0 | 1 | 0 | 0 |

The SDN controller may capture the user intent (e.g., to measure UDP performance across the network via synthetic probes). This architecture may also analyze the network topology and build a map of the current topology, all while utilizing existing probes. This architecture may reduce redundancy by using a single measurement to extrapolate QoE metrics for reverse paths and additional logical paths (e.g., VPNs, etc.) originating from the same device. The SDN controller may prune the probes to avoid duplicates and redundancy (e.g., device on the reverse path need not probe again). The SDN controller may also shuffle the probes to ensure the uniform distribution across the topology (or the sub-set within the topology). This architecture may leverage the existing interface on the device to configure and monitor the probes. The SDN controller may further maintain this intent map to correlate the probe related metrics (e.g., run a single probe between nodes 502A and 502B of FIG. 5 and the metrics such as jitter, packet loss, etc. may be applicable for both A and B).

Through utilizing the techniques described herein, the SDN controller may provide a unified management system for networking probes, enabling a network administrator to better visualize the state of network to help aid in better planning. For instance, once the SDN controller constructs the topological representation of the network, the SDN controller may output a visualization of the topological representation for display to a user. The SDN controller may also output a visualization of the results of the probe management process, indicating which node devices are sending probe packets and over which links those node devices are sending probe packets. This may enable the user to make more informed decisions about different routing possibilities, which node devices are probing the most devices, and how else the user may change the configurations or intent to best optimize the resources on the network.

Figure 6:
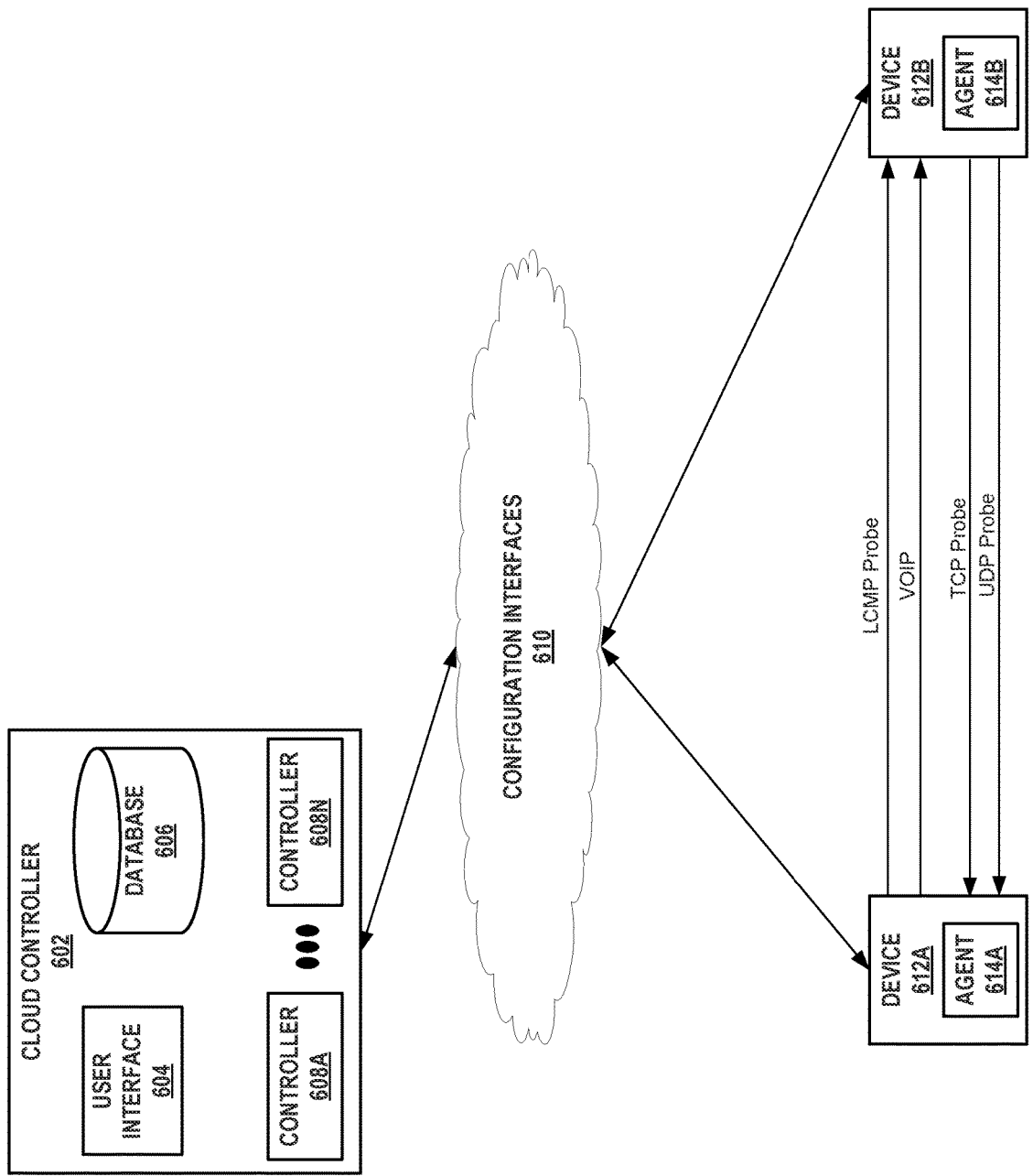
FIG. 6 is conceptual diagram illustrating an example architecture of a cloud controller configured to perform edge-based routing techniques, in accordance with the techniques of this disclosure.

FIG. 6 is conceptual diagram illustrating an example architecture of a cloud controller 602 configured to perform edge-based routing techniques, in accordance with the techniques of this disclosure. Cloud controller 602 may be an example of SDN controller 14 of FIG. 1, and may be configured to perform any of the techniques described herein. In some examples, cloud controller 602 may dynamically redistribute the probe assignments as nodes enter or leave the topology. The techniques described herein may also be utilized for other network arrangements than those described herein, including hub and spoke networks.

In the example of FIG. 6, devices 612A and 612B are connected by multiple logical paths under different protocols, including link control management protocol (LCMP), Voice over Internet protocol (VOIP), transmission control protocol (TCP), and UDP. As shown in FIG. 6, devices 612A and 612B may be exchanging probe packets over each of the logical paths to determine QoE metrics for each of the logical paths. The probe packets may be generated and analyzed by various components of each of devices 612A and 612B, such as agents 614A and 614B, respectively.

In accordance with the techniques described herein, cloud controller 602 may communicate with devices 612A and 612B via configuration interfaces 610 to alter the probing protocol for these devices. For instance, cloud controller 602 may instruct device 612A to refrain from sending any further probe packets to 612B. Further, cloud controller 602 may instruct device 612B to only send a probe packet over the UDP logical path. Cloud controller 602 may receive the QoE metrics from device 612B and store the QoE metrics in database 606. Cloud controller 602 may then extrapolate this data to estimate the QoE metrics for the UDP logical path between flowing from device 612A to device 612B, as well as each other logical path (LCMP, VOIP, and TCP) bidirectionally. Cloud controller 602 may also store these estimated QoE metrics in database 606.

As such, rather than sending 4, or even 8, probe packets to evaluate the QoE metrics between the links connecting devices 612A and 612B, cloud controller 602 may determine reliable QoE metrics for each path between devices 612A and 612B by sending only a single probe packet over the link. As such, the techniques described herein may reduce the traffic caused by the probe packets by as much as 87.5%.

Figure 7:
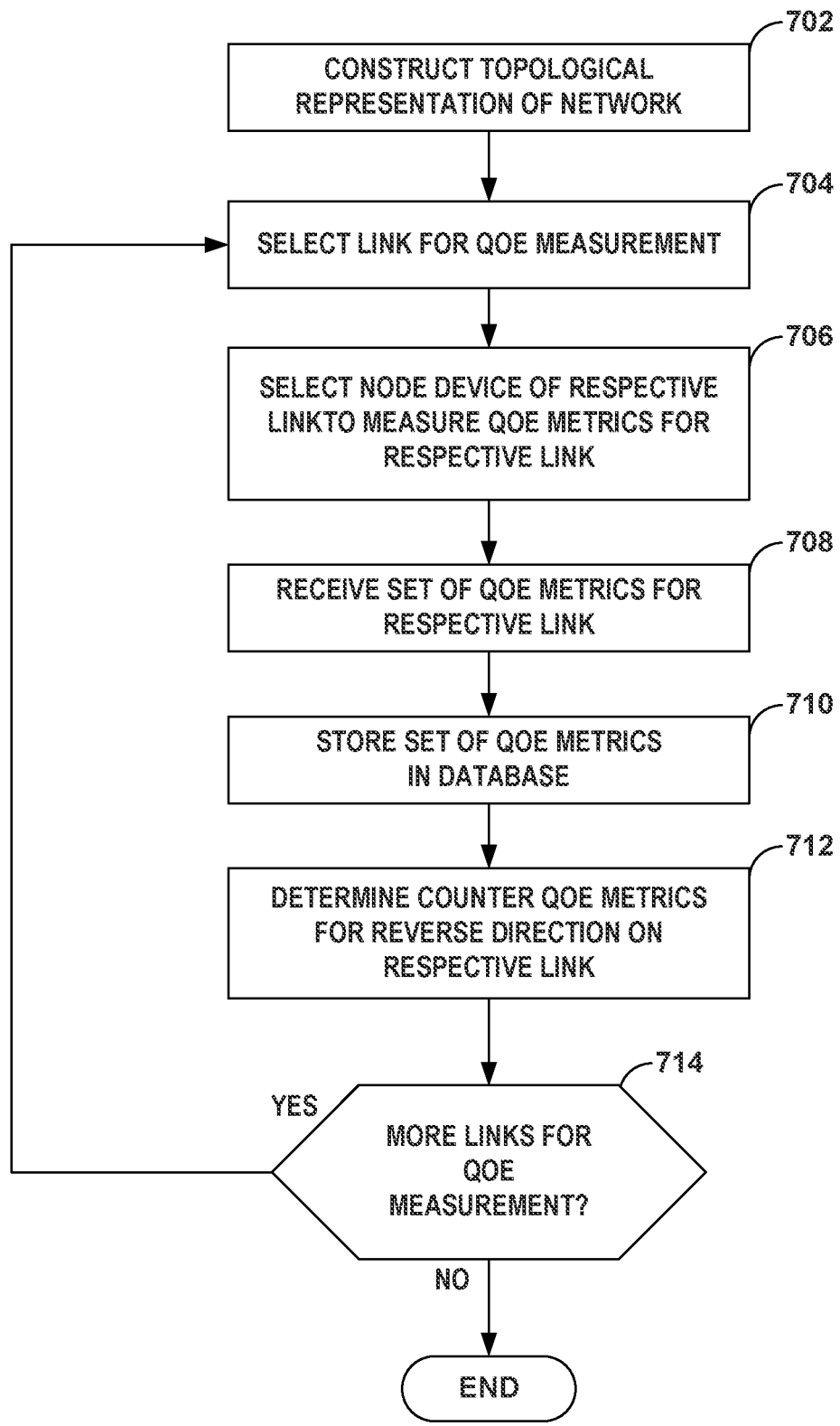
FIG. 7 is a flow diagram illustrating an example technique for a software-defined wide area network system that performs edge-based routing functions for nodes in the network, in accordance with the techniques of this disclosure.

FIG. 7 is a flow diagram illustrating an example technique for a software-defined wide area network system that performs probe assignment functions based on a topological representation of the network, in accordance with the techniques of this disclosure. The example operation may be performed by SDN controller 14 from FIG. 1, or SDN controller 60 of FIG. 3, for example. The following are steps of the process, although other examples of the process performed in the techniques of this disclosure may include additional steps or may not include some of the below-listed steps.

In accordance with the techniques described herein, SDN controller 14 may construct, for SD-WAN system 2 that includes a plurality of node devices (e.g., subscriber devices 16 and service nodes 10), a topological representation of SD-WAN system 2 (702). The topological representation may take any form (e.g., a matrix, a database, a graphic, text, or any other data structure) that provides an indication of each of the node devices and an indication of each link of a plurality of links, where each link connects two of the node devices. SDN controller 14 may select a link to evaluate for QoE metric measurement (704). For this respective link, SDN controller 14 may select, based on the topological representation of the network, a node device of the two node devices connected by the respective link to measure one or more QoE metrics for the respective link (706). As a result, the non-selected node device does not measure the QoE metrics for the respective link, meaning that only the selected node device will perform the active or synthetic probing functions for the respective link.

In response to selecting the selected node device to measure the one or more QoE metrics for the respective link, SDN controller 14 may receive, from the selected node device, a set of one or more QoE metrics for the respective link (708). These QoE metrics may be based on a received user intent, in the sense that the intent may specify what information is to be measured or what decision will be made based on the received information. As such, when selecting the node device of the two node devices, SDN controller 14 may indicate what QoE metrics are to be measured by the selected node device. This set of one or more QoE metrics would indicate QoE metrics for data flows flowing from the selected node device to the non-selected node device. SDN controller 14 may store the set of QoE metrics for the respective link in a database (710), such that the QoE metrics for this link may be referenced in further extrapolations and estimations for other links and/or the reverse direction for the link. For instance, SDN controller 14 may determine, based on the set of one or more QoE metrics for the respective link, a set of one or more counter QoE metrics indicating QoE metrics for data flows flowing from the non-selected node device to the selected node device (712).

SDN controller 14 may repeat this process for each link. For instance, if additional links exist where SDN controller 14 must assign a node device to measure the QoE metrics for that link (YES branch of 714), SDN controller 14 may select such a link for QoE evaluation, as described above (704). Otherwise (NO branch of 714), SDN controller 14 may monitor the network and assign application traffic during the normal course of operation.

Figure 8:
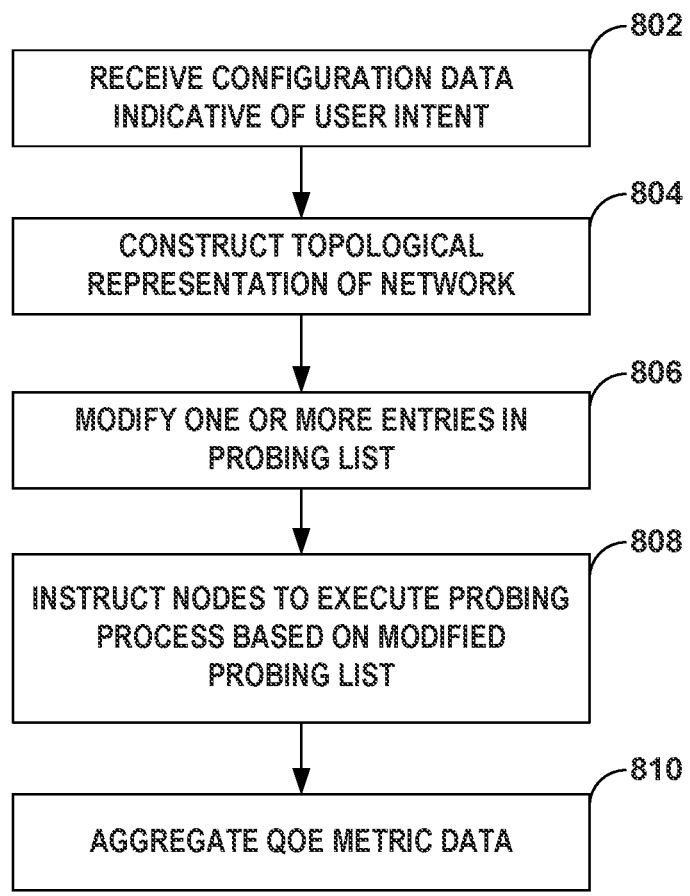
FIG. 8 is a flow diagram illustrating an example technique for a software-defined wide area network system that performs edge-based routing functions for nodes in the network, in accordance with the techniques of this disclosure.

FIG. 8 is a flow diagram illustrating an example technique for a software-defined wide area network system that performs probe assignment functions based on a topological representation of the network, in accordance with the techniques of this disclosure. The example operation may be performed by SDN controller 14 from FIG. 1, or SDN controller 60 of FIG. 3, for example. The following are steps of the process, although other examples of the process performed in the techniques of this disclosure may include additional steps or may not include some of the below-listed steps.

In accordance with the techniques described herein, topology unit 76 may receive configuration data indicative of a user intent for measuring application quality of experience (QoE) in a network (802). Based on this intent, topology unit 76 may construct a topological representation of the network that contains or is managed by SDN controller 60 (804). The topological representation of the network indicates each of a plurality of node devices in the network and an indication of each link of a plurality of links, each link connecting two node devices of the plurality of node devices. Probe management unit 77 may then modify, from an initial probing list that indicates which node devices in the plurality of node devices are performing a probing process and over which links said node devices are performing the probing process, one or more entries from the probing list to create a modified probing list such that only a single node device is performing the probing process for each of the links (806). Using this modified probing list, probe management unit 77 may instruct the node devices to perform probing processes on links corresponding only to the entries in the modified probing list (808). These instructions include instructing said node devices to send QoE metric data to SDN controller 60 upon performing the probing process. In essence, SDN controller 60 also instructs, either implicitly or explicitly, other node devices to refrain from performing the probing process over particular links if the corresponding entries were pruned from the probing list. The probing list may also be based on the user intent in the way that the probing list may include what information is to be measured during the probing process on each device. Once the node devices send the requested QoE metric data to SDN controller 60, topology unit 76 may aggregate the QoE metric data to complete the topology by extrapolating the received QoE metric data to estimate QoE metrics for connections not explicitly included in the probing list (810). In completing the topology, topology unit 76 may have a complete map of the node devices in the network, the links connecting the various node devices in the network, and application QoE metrics for each connection between node devices, in each direction. Using this complete topology, SDN controller 60 may orchestrate data flows within the network to satisfy the configuration data indicative of the user intent.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following claims.

What is claimed is:

1. A method comprising:
   selecting, by a controller from among a plurality of node devices of a network, a node device of two node devices connected by a link to measure one or more quality metrics for the link;
   in response to selecting the selected node device to measure the one or more quality metrics for the link, receiving, by the controller and from the selected node device, a measured one or more quality metrics for the link, wherein the measured one or more quality metrics indicate quality metrics for one or more data flows flowing from the selected node device to a non-selected node device of the two node devices; and
   determining, by the controller and based on the measured one or more quality metrics for the link, one or more counter quality metrics indicating quality metrics for data flows flowing from the non-selected node device to the selected node device.

2. The method of claim 1, further comprising:
   determining, by the controller, a path comprising a combination of a first link of a plurality of links and a second link of the plurality of links, wherein the first link connects a first node device of the plurality of node devices and a second node device of the plurality of node devices, wherein the second link connects the second node device of the plurality of node devices and a third node device of the plurality of node devices, and wherein the first node device of the plurality of node devices and the third node device of the plurality of node devices are not directly connected by any link of the plurality of links;
   retrieving, by the controller, a measured one or more quality metrics for the first link and a measured one or more quality metrics for the second link; and
   determining, by the controller and based on the measured one or more quality metrics for the first link and the measured one or more quality metrics for the second link, one or more quality metrics for the path.

3. The method of claim 1, further comprising:
   for a first link of a plurality of links that connects a first node device of the plurality of node devices and a second node device of the plurality of node devices,
   determining, by the controller, and based on the measured one or more quality metrics for the first link stored in the database, one or more quality metrics for a logical path connecting the first node device and the second node device, wherein the logical path is a different connection than the first link.

4. The method of claim 1, the method further comprising:
   for each link of a plurality of links of the network:
   determining, by the controller, whether a second node device of a pair of node devices connected by the respective link is configured to probe a total number of links less than or equal to a total number of links being probed by a first node device of the pair of node devices; and
   responsive to determining that the second node device is sending the total number of probes less than or equal to the total number of links being probed by the first node device, selecting, by the controller, the first node device to refrain from sending further probe packets to the second node device over the respective link.

5. The method of claim 4, further comprising:
   while there exist links in the plurality of links for which both node devices of a respective pair of node devices connected by a corresponding link is sending a probe packet over the corresponding link, selecting, by the controller, a singular node device of the respective pair of node devices connected by the corresponding link to refrain from probing the corresponding link based on the total number of links being probed by each node device connected by the corresponding link.

6. The method of claim 1,
   wherein selecting the node device of the two node devices connected by the link comprises determining, based on an adjacency matrix that indicates which node devices of the plurality of node devices are sending probe packets and a number of links for which each node device is measuring a respective measured one or more quality metrics, which node device of the two node devices is measuring the respective measured one or more quality metrics for fewer links,
   the method further comprising in response to selecting the selected node device to measure the one or more quality metrics for the link, updating, by the controller, the adjacency matrix.

7. The method of claim 1, further comprising:
   determining, by the controller, that a new node device has entered the network, wherein the new node device is connected to at least a first node device of the plurality of node devices via a new link;
   determining, by the controller, whether the first node device is configured to probe a total number of links less than or equal to the total number of links being probed by the new node device;
   responsive to determining that the first node device is probing the total number of links less than or equal to the total number of links being probed by the new node device, selecting, by the controller, the new node device to refrain from sending further probe packets to the first node device over the new link; and
   responsive to determining that the first node device is probing the total number of links greater than the total number of links being probed by the new node device, selecting, by the controller, the node device connected to the new node device over the new link to refrain from sending further probe packets to the new node device over the new link.

8. The method of claim 1, wherein selecting the node device of the two node devices connected by the link to measure the one or more quality metrics for the link comprises:
  instructing, by the controller, the selected node device of the two node devices connected by the link to send one or more probe packets over the link for measuring the one or more quality metrics.

9. The method of claim 1, further comprising:
  monitoring, by the controller, one or more probe packets sent over each of a plurality of links; and
  constructing, by the controller, based on the one or more probe packets sent over each of the plurality of links, and using graph theory, a topological representation of the network.

10. A controller comprising:
  a memory; and
  one or more processors in communication with the memory, the one or more processors configured to:
  select, from among a plurality of node devices of a network, a node device of two node devices connected by a link to measure one or more quality metrics for the link;
  in response to selecting the selected node device to measure the one or more quality metrics for the link, receive, from the selected node device, a measured one or more quality metrics for the link, wherein the measured one or more quality metrics indicate quality metrics for one or more data flows flowing from the selected node device to a non-selected node device of the two node devices; and
  determine, based on the measured one or more quality metrics for the link, one or more counter quality metrics indicating quality metrics for data flows flowing from the non-selected node device to the selected node device.

11. The controller of claim 10, wherein the one or more processors are further configured to:
  determine a path comprising a combination of a first link of a plurality of links and a second link of the plurality of links, wherein the first link connects a first node device of the plurality of node devices and a second node device of the plurality of node devices, wherein the second link connects the second node device of the plurality of node devices and a third node device of the plurality of node devices, and wherein the first node device of the plurality of node devices and the third node device of the plurality of node devices are not directly connected by any link of the plurality of links;
  retrieve a measured one or more quality metrics for the first link and a measured one or more quality metrics for the second link; and
  determine, based on the measured one or more quality metrics for the first link and the measured one or more quality metrics for the second link, one or more quality metrics for the path.

12. The controller of claim 10, wherein the one or more processors are further configured to:
  for a first link of a plurality of links that connects a first node device of the plurality of node devices and a second node device of the plurality of node devices, determine, based on the measured one or more quality metrics for the first link stored in the database, one or more quality metrics for a logical path connecting the first node device and the second node device, wherein the logical path is a different connection than the first link.

13. The controller of claim 10, wherein the one or more processors are further configured to, for each link of a plurality of links of the network:
  determine whether a second node device of a pair of node devices connected by the respective link is configured to probe a total number of links less than or equal to a total number of links being probed by a first node device of the pair of node devices; and
  responsive to the determination that the second node device is sending the total number of probes less than or equal to the total number of links being probed by the first node device, select the first node device to refrain from sending further probe packets to the second node device over the respective link.

14. The controller of claim 13, wherein the one or more processors are further configured to:
  while there exist links in the plurality of links for which both node devices of a respective pair of node devices connected by a corresponding link is sending a probe packet over the corresponding link, select a singular node device of the respective pair of node devices connected by the corresponding link to refrain from probing the corresponding link based on the total number of links being probed by each node device connected by the corresponding link.

15. The controller of claim 10, wherein the one or more processors being configured to select the node device of the two node devices connected by the link comprises the one or more processors being configured to determine, based on an adjacency matrix that indicates which node devices of the plurality of node devices are sending probe packets and how many links each node device is measuring a respective measured one or more quality metrics for, which node device of the two node devices is measuring the respective measured one or more quality metrics for fewer links,
  wherein the one or more processors are further configured to:
  in response to selection of the selected node device to send to measure the one or more quality metrics for the link, update the adjacency matrix.

16. The controller of claim 10, wherein the one or more processors are further configured to:
  determine that a new node device has entered the network, wherein the new node device is connected to a first node device of the plurality of node devices via at least one new link;
  determine whether the first node device is configured to probe a total number of links less than or equal to the total number of links being probed by the new node device;
  responsive to the determination that the first node device is probing the total number of links less than or equal to the total number of links being probed by the new node device, selecting, by the controller, the new node device to refrain from sending further probe packets to the first node device over the new link; and
  responsive to the determination that the first node device is probing the total number of links greater than the total number of links being probed by the new node device, select the node device connected to the new node device over the new link to refrain from sending further probe packets to the new node device over the new link.

17. The controller of claim 10, wherein the one or more processors being configured to select the node device of the two node devices connected by the link to measure the measured one or more quality metrics for the link comprises the one or more processors being configured to instruct the selected node device of the two node devices connected by the link to send one or more probe packets over the link for measuring the one or more quality metrics.

18. The controller of claim 10, wherein the one or more processors are further configured to:
monitor one or more probe packets sent over each of a plurality of links; and
construct, based on the one or more probe packets sent over each of the plurality of links, and using graph theory, a topological representation of the network.

19. Non-transitory computer-readable storage media storing instructions thereon that when executed cause one or more processors of a controller to:
select, from among a plurality of node devices, a node device of two node devices connected by a link to measure one or more quality metrics for the link;
in response to selecting the selected node device to measure the one or more quality metrics for the link, receive, from the selected node device, a measured one or more quality metrics for the link, wherein the measured one or more quality metrics indicate quality metrics for one or more data flows flowing from the selected node device to a non-selected node device of the two node devices; and
determine, based on the measured one or more quality metrics for the link, one or more counter quality metrics indicating quality metrics for data flows flowing from the non-selected node device to the selected node device.

20. The non-transitory computer-readable storage media of claim 19, the instructions further comprising instructions that when executed cause one or more processors of a controller to, for each link of a plurality of links of the network:
determine whether a second node device of a pair of node devices connected by the respective link is configured to probe a total number of links less than or equal to a total number of links being probed by a first node device of the pair of node devices; and
responsive to the determination that the second node device is sending the total number of probes less than or equal to the total number of links being probed by the first node device, select the first node device to refrain from sending further probe packets to the second node device over the respective link.

* * * * *